United States Patent
Fisher et al.

(10) Patent No.: US 11,718,103 B2
(45) Date of Patent: Aug. 8, 2023

(54) DIRECT THERMAL RECORDING MEDIA WITH PERFORATED PARTICLES

(71) Applicant: Appvion, LLC, Appleton, WI (US)

(72) Inventors: Mark R. Fisher, Appleton, WI (US); Michael B. Pitsch, Chippewa Falls, WI (US)

(73) Assignee: Appvion, LLC, Appleton, WI (US)

( * ) Notice: Subject to any disclaimer, the term of this patent is extended or adjusted under 35 U.S.C. 154(b) by 28 days.

(21) Appl. No.: 17/032,876

(22) Filed: Sep. 25, 2020

(65) Prior Publication Data

US 2021/0086524 A1    Mar. 25, 2021

Related U.S. Application Data

(60) Provisional application No. 62/905,815, filed on Sep. 25, 2019.

(51) Int. Cl.
*B41J 2/36* (2006.01)
*B41J 2/48* (2006.01)
*G06K 1/12* (2006.01)

(52) U.S. Cl.
CPC . *B41J 2/48* (2013.01); *B41J 2/36* (2013.01); *G06K 1/121* (2013.01)

(58) Field of Classification Search
CPC ......... B41J 2/48; B41J 2/36; B41J 2/32; B41J 2/325; B41J 2/315; B41M 5/36; B41M 5/26; B41M 5/28; B41M 2205/04
See application file for complete search history.

(56) References Cited

U.S. PATENT DOCUMENTS

| 2,574,439 A | 11/1951 | Seymour |
| 2,739,909 A | 3/1956 | Rosenthal |
| 2,740,895 A | 4/1956 | Miller |

(Continued)

FOREIGN PATENT DOCUMENTS

| GB | 1043541 | 9/1966 |
| JP | S54 66849 | 5/1979 |

(Continued)

OTHER PUBLICATIONS

International Search Report for PCT/US2020/052828, dated Jan. 18, 2021, 5 pages.

(Continued)

*Primary Examiner* — Kristal Feggins
(74) *Attorney, Agent, or Firm* — Amundsen Davis, LLC

(57) ABSTRACT

Direct thermal recording media are designed to operate based on a thermally-induced change of state rather than a thermally-induced chemical reaction between a leuco dye and an acidic developer. The media use two types of scattering particles, one of which changes its state from solid to liquid during printing, and the other of which does not. The former particles, upon melting, fill spaces between the latter particles, thus eliminating or substantially reducing light scattering, which makes an underlying colorant visible at selected print locations where heat is locally applied. The latter, higher melting point particles have a caged morphology and comprise perforated particles. The media can provide high quality thermally-produced images at print speeds at least as high as 10 inches per second (ips).

26 Claims, 13 Drawing Sheets

(56) References Cited

U.S. PATENT DOCUMENTS

| | | | |
|---|---|---|---|
| 2,859,351 | A | 11/1958 | Clark et al. |
| 2,927,039 | A | 3/1960 | Vander Weel |
| 2,957,791 | A | 10/1960 | Bechtold |
| 3,180,752 | A | 4/1965 | Bollinger et al. |
| 3,228,785 | A | 1/1966 | Growald et al. |
| 3,306,763 | A | 2/1967 | Hoge |
| 3,359,375 | A | 12/1967 | Hannan |
| 3,515,570 | A | 6/1970 | Suzuki |
| 3,674,535 | A | 7/1972 | Blose et al. |
| 3,746,675 | A | 7/1973 | Blose et al. |
| 3,853,579 | A | 12/1974 | Heiser |
| 3,949,138 | A | 4/1976 | Heiser |
| 3,953,659 | A | 4/1976 | Truitt |
| 4,151,748 | A | 5/1979 | Baum |
| 4,181,771 | A | 1/1980 | Hanson et al. |
| 4,246,318 | A | 1/1981 | Baum |
| 4,370,370 | A | 1/1983 | Iwata et al. |
| 4,470,057 | A | 9/1984 | Glanz |
| 4,577,204 | A | 3/1986 | Shibata et al. |
| 5,109,153 | A | 4/1992 | Johnsen et al. |
| 5,378,534 | A | 1/1995 | Kuroanagi et al. |
| 6,043,193 | A | 3/2000 | Chen et al. |
| 6,252,004 | B1 | 6/2001 | Blankenship et al. |
| 6,573,922 | B1 * | 6/2003 | Orita ............... B41J 2/315 347/191 |
| 6,670,010 | B2 | 12/2003 | Nagamoto et al. |
| 6,803,088 | B2 | 10/2004 | Kaminsky et al. |
| 7,651,747 | B2 | 1/2010 | Chen et al. |
| 8,054,323 | B2 | 11/2011 | Peters et al. |
| 8,106,934 | B2 | 1/2012 | Ishimi et al. |
| 8,536,087 | B2 | 9/2013 | Harrison et al. |
| 8,598,075 | B2 | 12/2013 | Ochiai et al. |
| 9,193,208 | B2 | 11/2015 | Chung et al. |
| 9,663,650 | B2 | 5/2017 | Jhaveri |
| 9,757,968 | B1 | 9/2017 | Guzzo et al. |
| 9,932,487 | B2 | 4/2018 | Einsla et al. |
| 2006/0038871 | A1 | 2/2006 | Chen et al. |
| 2007/0065749 | A1 | 3/2007 | Kasperchik et al. |
| 2010/0245524 | A1 | 9/2010 | Peters et al. |
| 2011/0287930 | A1 | 11/2011 | Ochiai et al. |
| 2014/0037901 | A1 | 2/2014 | Chung et al. |
| 2014/0213691 | A1 | 7/2014 | Jhaveri |
| 2016/0001583 | A1 | 1/2016 | Iwata et al. |
| 2017/0337851 | A1 | 11/2017 | Guzzo et al. |
| 2019/0291493 | A1 | 9/2019 | Fisher et al. |

FOREIGN PATENT DOCUMENTS

| | | |
|---|---|---|
| WO | WO 2017/223198 | 12/2017 |
| WO | WO 2019/183471 | 9/2019 |

OTHER PUBLICATIONS

Written Opinion of the ISA for PCT/US2020/052828, dated Jan. 18, 2021, 6 pages.

* cited by examiner

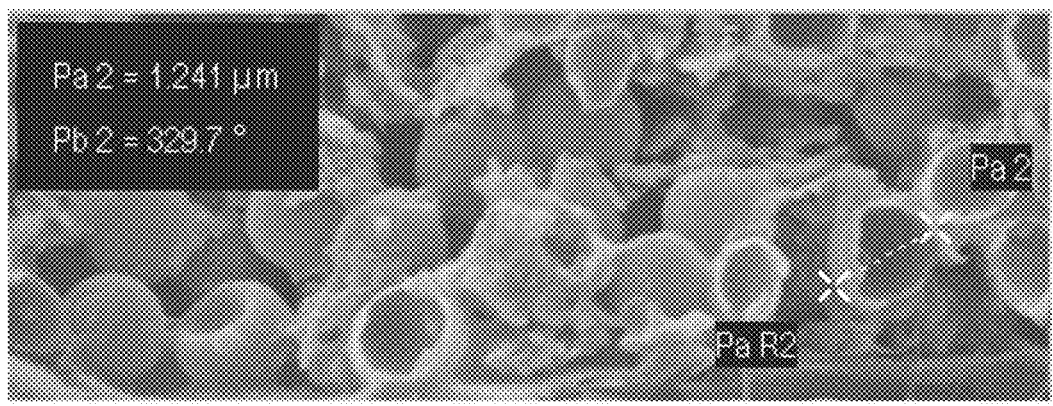
FIG. 7A
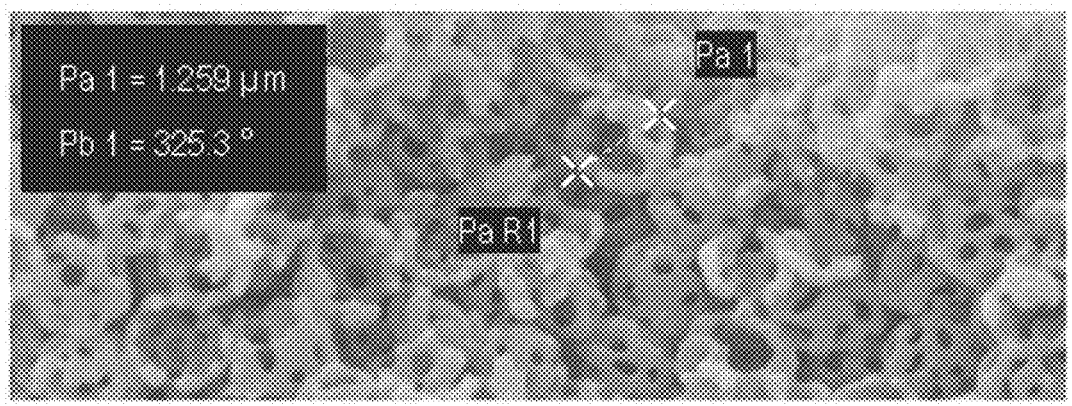
FIG. 7B
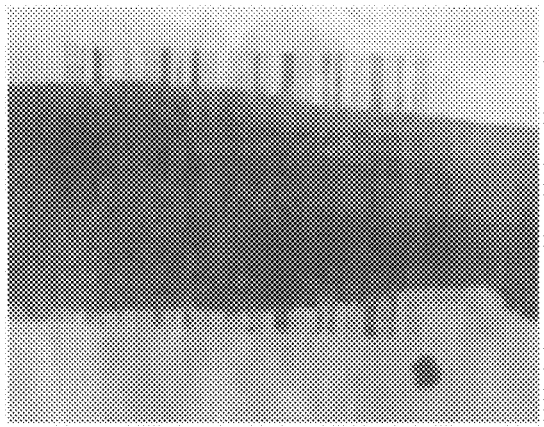 
FIG. 8A          FIG. 8B

DIRECT THERMAL RECORDING MEDIA WITH PERFORATED PARTICLES

CROSS REFERENCE TO RELATED APPLICATIONS

This application claims priority under 35 U.S.C. § 119 (e) to provisional patent application U.S. Ser. No. 62/905,815, "Direct Thermal Recording Media With Perforated Particles", filed Sep. 25, 2019, the contents of which are incorporated herein by reference.

FIELD OF THE INVENTION

The present invention relates to direct thermal recording media, with particular application to direct thermal recording media that incorporate neither a leuco dye nor an acidic developer to provide a heat-activated printing mechanism. The invention also pertains to related methods, systems, and articles.

BACKGROUND OF THE INVENTION

Numerous types of direct thermal recording media, sometimes referred to as thermally-responsive record materials, are known. See, for example, U.S. Pat. No. 3,539,375 (Baum); U.S. Pat. No. 3,674,535 (Blose et al.); U.S. Pat. No. 3,746,675 (Blose et al.); U.S. Pat. No. 4,151,748 (Baum); U.S. Pat. No. 4,181,771 (Hanson et al); U.S. Pat. No. 4,246,318 (Baum); and U.S. Pat. No. 4,470,057 (Glanz). In these cases, basic colorless or lightly colored chromogenic material, such as a leuco dye, and an acidic color developer material are contained in a coating on a substrate which, when heated to a suitable temperature, melts or softens to permit the materials to react, thereby producing a colored mark or image. Thermally-responsive record materials have characteristic thermal response, desirably producing a colored image of sufficient intensity upon selective thermal exposure.

Some direct thermal recording media that do not utilize leuco dyes or acidic color developers are also known. For example, US 2017/0337851 (Guzzo et al.) discusses embodiments in which a reveal coat layer includes an acrylic-based composition including light-scattering particles that cause the reveal coat layer to be opaque in a first state and transparent in a second state, the application of at least one of heat and pressure from a print head causing the reveal coat layer to transition from the first state to the second state, thereby enabling at least one color of an ink layer to be visible through the reveal coat layer. The reveal coat layer uses small diameter hollow spheres that scatter light. When heat or pressure is applied to the reveal coat, the spheres are said to flatten and lose their spherical shapes, causing the reveal coat to become transparent.

In another example, U.S. Pat. No. 9,193,208 (Chung et al.) discusses recording materials including a support and disposed thereon at least one layer including certain core/shell polymeric particles, the particles having, when dry, at least one void, and an opacity reducer is provided. During printing, the polymeric particles including a void are believed to collapse in the area where the heat and pressure was applied by the thermal head, and the collapsed portions of the layer become transparent showing the underlying black color where it was printed.

SUMMARY OF THE INVENTION

Alternatives to leuco dye-based thermal recording materials may be desirable for a number of reasons, including recent supply chain concerns with some dye-related source materials, and the constant push to adopt products with simpler, and even more environmentally friendly, chemistries.

In an example under common ownership with the present application, US 2019/0291493 (Fisher et al.) discusses direct thermal recording media designed to operate based on a thermally-induced change of state rather than a thermally-induced chemical reaction between a leuco dye and an acidic developer. The media use two types of solid scattering particles, one of which changes its state from solid to liquid during printing, and the other of which does not. The former particles, upon melting, fill spaces between the latter particles, thus eliminating or substantially reducing light scattering, which makes an underlying colorant visible at selected print locations where heat is locally applied. The media can provide high quality thermally-produced images at print speeds at least as high as 10 inches per second (ips).

A need exists in the industry for alternative thermally responsive record materials. Such alternative materials would preferably avoid leuco dye chemistry and would be suitable for use in diverse applications such as labeling, facsimile, point of sale (POS) printing, printing of tags, and pressure sensitive labels. The alternative materials would also preferably be compatible with thermal printers whose print speed is at least 6, or 8, or even 10 inches per second (ips).

We have developed a new family of direct thermal recording materials or media that can be tailored to satisfy one, some, or all of these needs. The disclosed direct thermal recording media are designed to operate based on a thermally-induced change of state rather than a thermally-induced chemical reaction between a leuco dye and an acidic developer. The media use two types of scattering particles, one of which changes its state from solid to liquid during printing, and the other of which does not. The former particles, upon melting, fill spaces between the latter particles, thus eliminating or substantially reducing light scattering, which makes an underlying colorant visible at selected print locations where heat is locally applied. The media can provide high quality thermally-produced images at print speeds at least as high as 10 inches per second (ips). The new family of recording materials also preferably uses particles that have a perforated or caged morphology, discussed further below, as the particles that don't substantially melt or deform during the printing process.

We therefore disclose herein, among other things, recording media that include a substrate and a light-scattering layer carried by the substrate. The light-scattering layer includes perforated particles, or particles that have a caged morphology.

We also disclose recording media that include a substrate, a first light-scattering layer carried by the substrate and including first scattering particles having a first melting point. Also included is a plurality of second scattering particles proximate the first light-scattering layer, the second scattering particles having a second melting point lower than the first melting point. The first light-scattering layer is porous, and the second scattering particles are disposed to, upon melting, fill spaces between the first scattering particles. The first scattering particles include perforated particles. A thermal insulating layer may be included between the first light-scattering layer and the substrate. A colorant may also be included beneath the first light-scattering layer and in, on, or under the thermal insulating layer.

Applying sufficient heat or energy at selected print locations to a side of the recording medium on which the first light-scattering layer resides can cause the second scattering particles, but not the first scattering particles, to melt at the selected print locations, such that the second scattering particles, upon melting, fill spaces between and within the first scattering particles to render the first light-scattering layer substantially transparent in the selected print locations. The colorant may become visible at the selected print locations but remain obscured by other portions of the first light-scattering layer. A print quality of the recording medium when used with a thermal printer energy setting of 11.7 mJ/mm$^2$ at a print speed of 6, or 8, or 10 inches per second (ips) may be characterized by an ANSI value of at least 1.5. The first scattering particles may have a first average size in a range from 0.5 to 1.5 micrometers, and the second scattering particles may have a second average size in a range from 0.2 to 1 micrometer. The second melting point may be at least 80° C. or at least 90° C., or in a range from 80 to 150° C., and the first melting point may be at least 50° C. greater than the second melting point.

In some cases, the second scattering particles are dispersed throughout the first light-scattering layer. The first scattering particles, the second scattering particles, and a binder may make up at least 95% (total dry solids) of the first light-scattering layer. The first light-scattering layer may consist essentially of the first scattering particles, the second scattering particles, the binder, and an optional lubricant. The first light-scattering layer may be exposed to air, and may contain hollow particles from 5% to 20% (total dry solids). The medium may also include a topcoat exposed to air, and disposed directly or indirectly on the first light-scattering layer. The first light-scattering layer may contain substantially no hollow particles. The first light-scattering layer may be substantially devoid of leuco dyes and acidic developers.

In some cases, the second scattering particles may be disposed in a second light-scattering layer adjacent the first light-scattering layer. The first and second light-scattering layers may both be substantially devoid of leuco dyes and acidic developers.

The second scattering particles may comprise a non-polymeric crystalline organic material, e.g., at least one of diphenyl sulfone (DPS), diphenoxyethane (DPE), ethylene glycol m-tolyl ether (EGTE), and β-naphthylbenzylether (BON). The first scattering particles may be polymeric or inorganic, e.g., they may comprise at least one of aluminum trihydrate (ATH), calcium carbonate, polyethylene, polystyrene, and silica. The first scattering particles may not be soluble in acetone. The first scattering particles and the second scattering particles may not be chemically reactive with each other. Neither the first scattering particles nor the second scattering particles may contain any chemical functional group. A ratio of the first scattering particles to the second scattering particles, measured in terms of total dry solids, may be in a range from 1 to 3, or 1.5 to 2.5. The first scattering particles may include some particles that have a drupelet morphology, or other complex morphology.

The perforated particles may have holes characterized by relative sizes (relative to the size of the particle) of at least 10%, or at least 15%, or in a range from 20 to 40%. Additionally or alternatively, the perforated particles may have a hole coverage of at least 40%, or in a range from 40 to 70%.

We disclose numerous related methods, systems, and articles.

These and other aspects of the present disclosure will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

The inventive articles, systems, and methods are described in further detail with reference to the accompanying drawings, of which:

FIG. 7A is a highly magnified SEM image of a layer of hollow sphere pigment (HSP) particles;

FIG. 7B is a highly magnified SEM image of a layer of particles having a morphology similar to that of FIG. 1C;

FIG. 8A is a grayscale image of a recording medium that was made using HSP particles in the light-scattering layer, and then thermally printed with a bar code pattern, after which vegetable oil was brushed on the surface;

FIG. 8B is a grayscale image of a recording medium having a construction substantially similar to that of FIG. 8A except that the HSP particles were replaced by particles having the morphology of FIG. 7B, this medium also being thermally printed and then brushed with vegetable oil;

In the figures, like reference numerals designate like elements.

DETAILED DESCRIPTION OF ILLUSTRATIVE EMBODIMENTS

As noted above, we have developed a new family of non-leuco dye-based thermally responsive recording media that can provide high quality thermally generated images when used with conventional POS thermal printers, thermal label printers, and the like. The disclosed recording media preferably employ no, or substantially no, leuco dyes or acidic developers. Some embodiments also employ no, or substantially no, hollow sphere particles in the light-scattering layer(s) of the recording medium (as distinguished from a thermal insulating layer which may be present between the light scattering layer(s) and the substrate, which thermal insulating layer may contain a significant number of hollow sphere particles), while other embodiments may employ a limited amount of hollow sphere particles in such layer(s). The new recording media operate based on a thermally-induced change of state rather than a thermally-induced chemical reaction. The media use two types of scattering particles, one of which changes its state from solid to liquid during printing, and the other of which does not. The former particles, upon melting, fill spaces between the latter particles, thus eliminating or substantially reducing light scattering at the surfaces of such particles, making an underlying colorant visible at selected print locations where heat is locally applied. The latter scattering particles (which do not melt during printing) consist of or include particles having a perforated or caged morphology or structure. The media can provide high quality thermally-produced images, and in some embodiments such images can be formed at print speeds at least as high as 10 inches per second (ips).

Figure 1A:
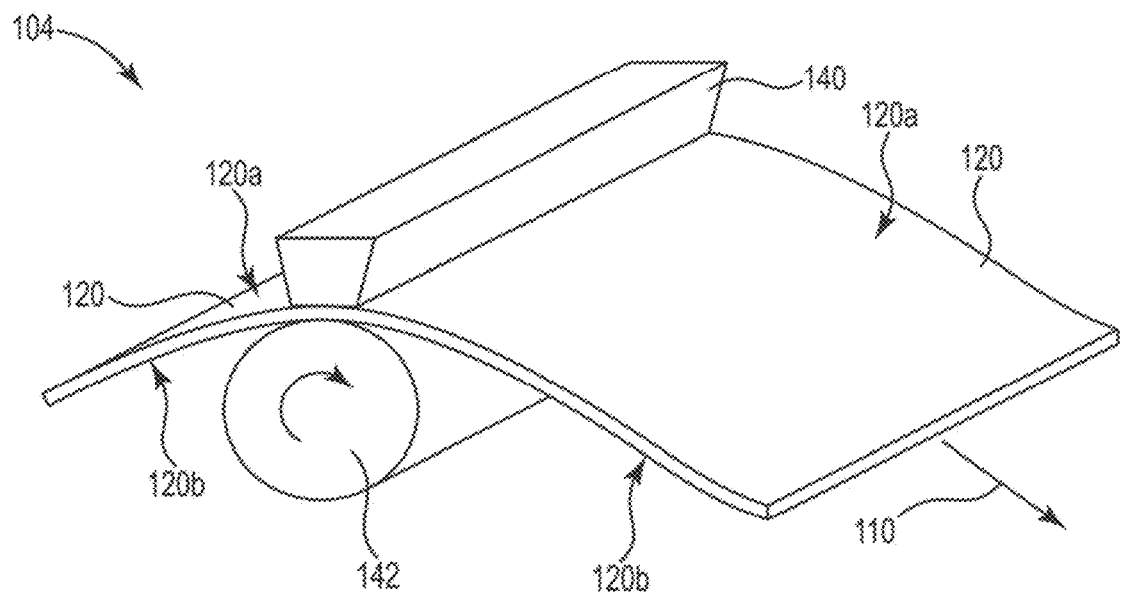
FIG. 1A is a schematic perspective view of a direct thermal printing system in which a direct thermal recording medium passes across a thermal print head to provide a thermally printed image.

A schematic representation of a printing system employing a direct thermal recording medium as disclosed herein is shown in FIG. 1A. In the figure, a printing system 104 includes a thermal print head 140 positioned close to a rotating roller 142. A piece, sheet, or roll of direct thermal recording medium or material 120 is fed into the system and pulled along a feed direction 110 past, and while being pressed against, the print head 140. The recording material 120 is preferably a thin, flexible, sheet-like material composed of a base paper or other substrate to which one or more coatings have been applied.

The recording material 120 has first and second opposed major surfaces 120a, 120b. In many but not all cases, the recording material 120 is one-sided or asymmetric, such that thermal printing can be performed on one major surface, but not the opposite major surface, of the recording material. In FIG. 1A, the first major surface 120a corresponds to the side of the recording material 120 that is adapted for thermal printing. The first major surface 120a may press against and slide across the underside of the print head 140 as the recording material passes through the printing system 104. A controller (not shown) controls the print head 140 to selectively and rapidly modulate small heating elements on the underside of the print head in a manner consistent with the desired image, taking into account the constant speed of the recording material 120 along the feed direction 110. As explained further below, coating(s) of the recording material 120 are designed to bring about a change in color or appearance at the selected locations where the print head provides the necessary heat. The changes in color at the selected print locations provide the desired thermally printed image.

Figure 1B:
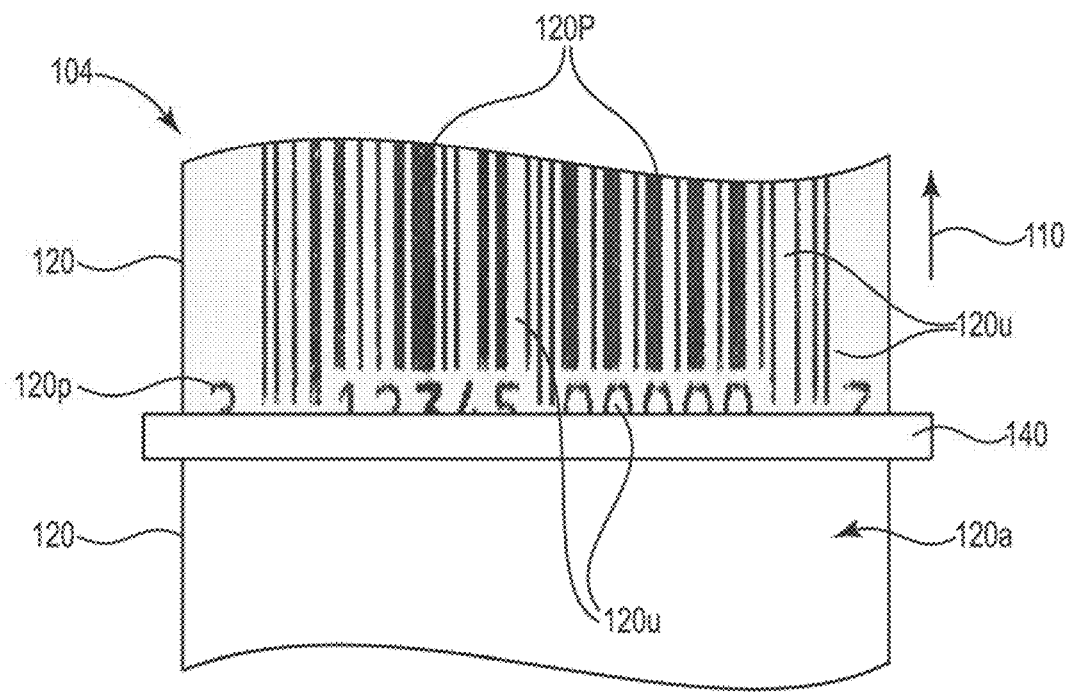
FIG. 1B is a schematic top view of the printing system of FIG. 1A, this view also illustrating a representative thermal image being formed on the recording medium.

FIG. 1B is a schematic top view of the printing system 104 of FIG. 1A, where like elements have like reference numbers and will not be described again to avoid needless repetition. In FIG. 1B, printed portions 120p and unprinted portions 120u of the recording material 120 are identified in the context of a representative thermal image being formed on the recording medium 120. In the figure, the representative thermal image is a specific bar code pattern and set of alphanumeric characters; however, any other desired image or pattern can instead be printed, with appropriate modulation control of the print head. The printed portions 120p are locations on the recording material 120 where the thermal print head 140 provided sufficient heat, during the short time period when the location in question was exposed to heating element(s) of the print head, to accomplish the transformation of the appearance of the recording material from a background color to a foreground or printed color. In most cases, the background color is preferably white or near-white, and the printed color is preferably black or another dark color to provide good contrast with the lighter background color. Unprinted portions 120u of the recording material 120 have the same white or bright color as the overall appearance or color of the first major surface 120 before printing.

Figure 1C:
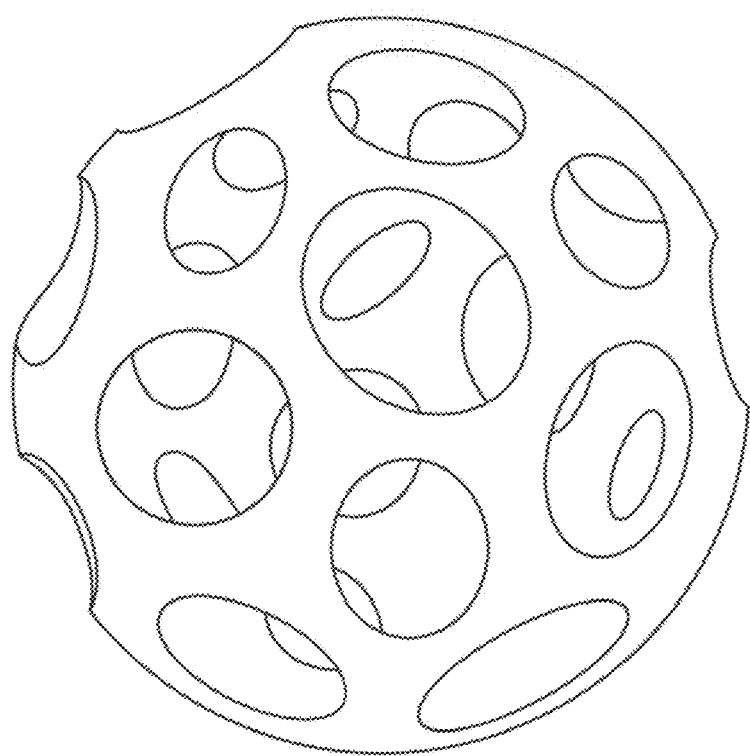
FIG. 1C is an idealized schematic view of a scattering particle having a perforated or cage-structure appearance or morphology.

We have found that direct thermal recording media and materials can substantially benefit from the use of a unique type of light-scattering particle. The unique particles are each characterized by a structure or morphology that can be described as cage-like, cage-structured, or perforated. Such a particle has an outer shell with openings or perforations therein that would permit a much smaller object to pass through the perforated particle (cage structure) without contacting the walls of the particle. An idealized, greatly magnified view of such a particle is shown in FIG. 1C. Bulk quantities of perforated particles such as this, but whose size is on the order of microns, are commercially available.

Such perforated particles are preferably composed of a suitable light-transmissive material, the melting point of which may be relatively high so that the particles can be used as the "first" scattering particles referenced herein. Alternatively, the perforated particles may in some cases be composed of a relatively low melting point light-transmissive material, and used as the "second" scattering particles. In still other cases, the perforated particles may have any desired melting point—high, low, or intermediate—and may be incorporated into any layer(s) of any of the disclosed embodiments. The sub-particle-size fine structure and numerous distinct edges and surfaces defined by that structure provide the perforated particles with many light-scattering features, making them well suited for light scattering.

The pass-through or open morphology enabled by the apertures in the outer shell and empty interior also make these particles well suited for these direct thermal products, since their open structure makes them easily penetrated by the liquid or molten low melting point solid scattering particles after the latter particles melt, e.g. under the influence of a thermal print head. This is the opposite behavior of high melting point HSP particles, whose closed structure make them unable to be penetrated by melted material from the other particles. The closed structure of the HSP particles also account for their widespread use as thermal insulators.

Figure 2A:
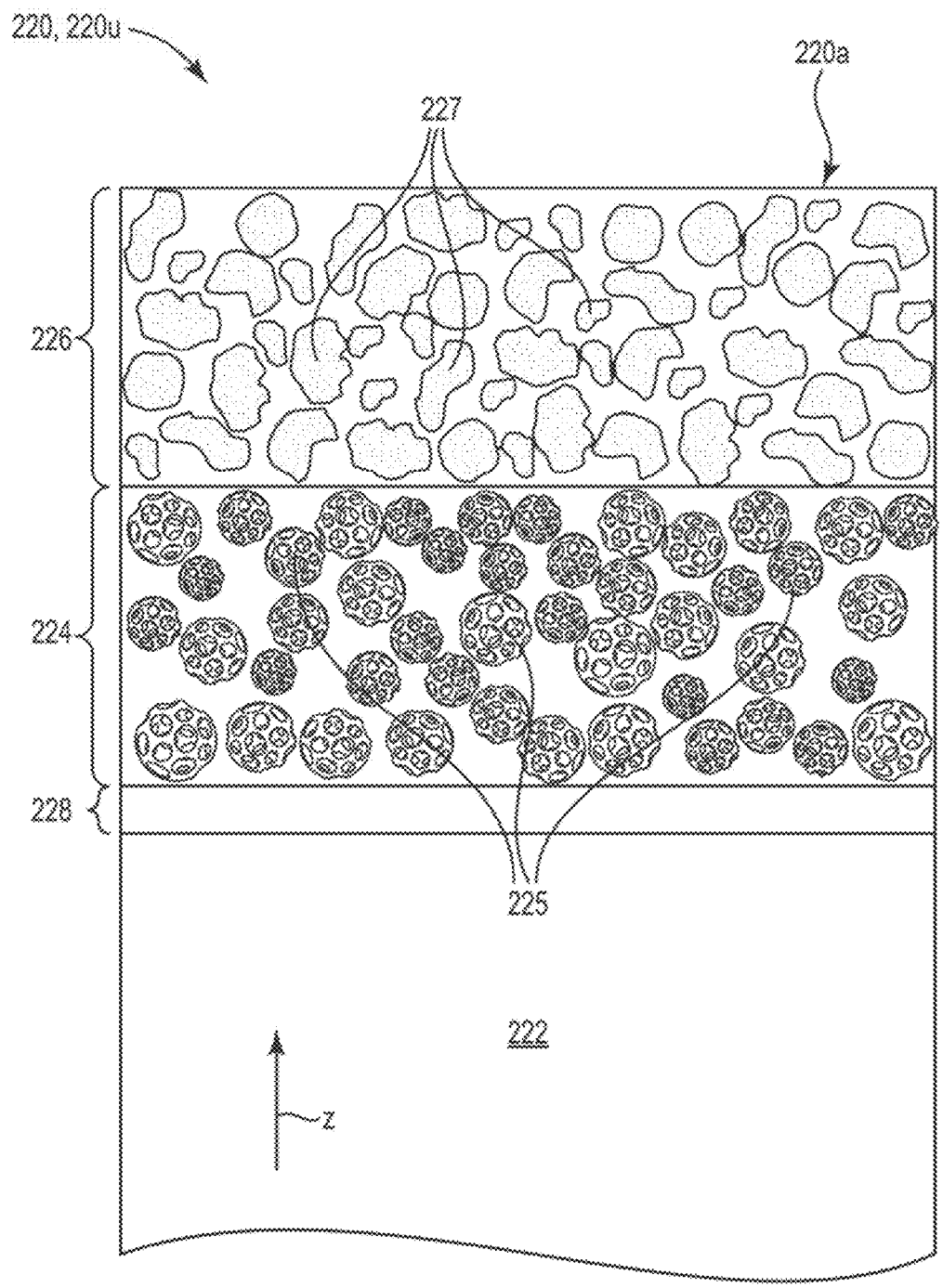
FIG. 2A is a schematic front elevation view, which also serves as a schematic cross-sectional view, of a recording material or medium, or portion thereof, having a so-called bi-layer construction.

A schematic side or sectional view of a non-leuco dye-based direct thermal recording material capable of exhibiting the functionality of FIGS. 1A and 1B, using perforated particles as shown in FIG. 1C, is shown in FIG. 2A. In this figure and other figures showing side elevation or cross-sectional views of the product, relative layer thicknesses may not be to scale. The figure shows only a narrow slice or section of a direct thermal recording material 220, which would typically extend along a plane perpendicular to the thickness axis z of the material. The recording material 220 is intended to represent the recording material after manufacture but before ever being processed through a thermal printer. The recording material of FIG. 2A may however also represent the recording material after processing through a thermal printer, but at a location that was not substantially subjected to heat from the print head. FIG. 2A may thus also be considered to represent an unprinted portion 220u of a direct thermal recording material. The recording material 220 has opposed major surfaces exposed to air, one of which is labeled as major surface 220a.

The recording material 220 includes a substrate 222, a light-scattering layer 224, and a thermal insulating layer 228 between the light-scattering layer 224 and the substrate 222. A colorant (not shown separately) is preferably included in or on the thermal insulating layer 228. The light-scattering layer includes first scattering particles 225 which have the caged or perforated morphology of FIG. 1C. The recording material 220 also includes second (solid) scattering particles 227 proximate the light-scattering layer 224.

The first and second scattering particles have different melting points, and the two particle types are physically close enough to each other such that: (a) when sufficient heat is applied to the top side of the recording material (from the perspective of FIG. 2A), the second scattering particles 227, but not the first scattering particles 225, melt and fill spaces between the first scattering particles, which renders the light-scattering layer 224 substantially transparent; or (b) when passing the recording material through a conventional thermal printer, the second scattering particles 227, but not the first scattering particles 225, rapidly melt and, upon melting, fill spaces between the first scattering particles to render the light-scattering layer 224 substantially transparent; or both (a) and (b). In practice, the heating is usually applied only at selected print locations to create a desired image. Due to the open morphology of the perforated scattering particles 225, the second particles 227, upon melting, not only fill spaces between the particles 225, but may also fill or at least partially penetrate the core or interior space at the center of each particle 225.

In the embodiment of FIG. 2A, the second scattering particles 227 are physically separated from the first scattering particles 225, such that they form a light-scattering layer 226 that is distinct from, but adjacent to, the light-scattering layer 224. Since the recording material 220 has two light-scattering layers, it may be said to have a bi-layer construction.

The substrate 222 is preferably thin, substantially planar, and flexible. The substrate 222 has a thickness defined by its opposed major surfaces, one of which is shown in FIG. 2A. The substrate may preferably be or comprise a cellulose material, such as a conventional paper. The paper may have a basis weight in a range from 35 to 200 g/m$^2$, but other suitable basis weights may also be used. The paper may also be treated with one or more agents, such as a surface sizing agent. Uncoated base papers, including unsized, conventionally sized, and lightly treated base papers, can be used. Alternatively, the substrate 222 may be or include a polymeric film, whether single-layer or multilayer in construction. Exemplary polymeric films include polypropylene films, including biaxially oriented polypropylene (BOPP) films. The substrate 222 may be simple in construction, and devoid of glossy coatings, or of other substantial, functional coatings. The substrate 222 may, for example, be substantially uniform in composition throughout its thickness, rather than a multilayered construction or material to which one or more separate, functional coatings have already been applied. In some cases, however, it may be desirable to treat, prepare, or otherwise work the substrate 222 in preparation for coating onto it the other layers shown in the figure. The substrate 222 and its major surfaces may also be light-diffusive and opaque in character.

The thermal insulating layer 228 may in some cases be characterized or described as a separator layer, heat-reflective layer, isolation layer, or prime coat. As indicated by its name, the layer 228 provides a degree of thermal insulation between the light-scattering layer 224 and the substrate 222. Such thermal insulation promotes print quality, print speed, or both, by ensuring that heat delivered by the thermal print head to the light-scattering layer 224 or other coatings is not substantially lost by thermal conduction to the more massive substrate 222. The thermal conductivity of the layer 228 is thus preferably less than both the thermal conductivity of the light-scattering layer 224, and the thermal conductivity of the substrate 222.

The thermal insulating layer 228 may comprise hollow sphere pigments (HSP), such as product code Ropaque™ TH-2000 or TH-500EF available from The Dow Chemical Company, or other suitable materials. The thermal insulating layer 228 can be made by a process in which a dispersion is coated onto the surface of the substrate, and then dried. In some cases, the thermal insulating layer-including the layer 228 of FIGS. 2A-2D, the layer 328 of FIG. 3, the layer 428 of FIG. 4, and the layer 528 of FIG. 5—may be eliminated and omitted from the product construction. When included as part of the recording material, the thermal insulating layer may have a thickness in a range from 2 to 12 μm, or other suitable thicknesses.

Carbon black or other suitable colorants can be included in or on the thermal insulating layer 228. Colorants that may be suitable are dependent on product design requirements, and may include any one or more of: carbon black; Leuco Black Sulfur 1; Phthalo blue; and any other suitable dye or pigment. In some cases the colorant(s) can be included in the layer 228 itself, e.g., dispersed throughout the thickness of the coating. In other cases, the colorant(s) can be included as a separate layer or coating atop the thermal insulating layer 228, between the layer 228 (if present) and the light-scattering layer 224. In still other cases, one or more first colorants can be included in the layer 228, and one or more second colorants, which may be the same as or different from the first colorant(s), may be included on the layer 228. In general, the colorant provides an appearance, hue, or color that differs substantially from that of unprinted portions, or background areas, of the thermal recording material 220, to provide sufficient visual contrast between printed and unprinted portions to make the printed image observable to a user.

The light-scattering layer 224 of the recording material 220 includes the first scattering particles 225, some or all of which have the desired perforated morphology and which differ in composition from the second scattering particles 227. The particles 225 are made of a light-transmissive material, but when they are immersed in air, one or more of reflection, refraction, and diffraction at the surfaces of the particles causes them to be strong scatterers of incident visible light. The sizes of the particles 225 may also be chosen to enhance visible light scattering when immersed in air. In this regard, the particles 225 may be tailored to have an average diameter in a range from 0.5 to 1.5 micrometers, but sizes outside of this preferred range are also feasible. Generally speaking, smaller particle sizes produce more scattering for a given layer thickness due to the greater number of surface interfaces.

The perforated scattering particles 225 may have a nominally spherical shape or outer envelope as shown in FIGS. 1C and 2A, but they need not be so ideal, and may be elongated, flattened, skewed, or otherwise irregular in shape. The light-transmissive material of which the particles 225 are made is preferably of relatively high melting point, such that the particles 225 do not substantially flatten, collapse, melt, or otherwise deform under the action of the thermal print head during printing. In this way, the particles 225 help provide mechanical stability for the light-scattering layer 224 during printing. The particles 225 may for example have a melting point that is at least 50° C. greater than that of the second scattering particles 227. Exemplary materials for the particles 225 include polymers and inorganic materials, thermoplastics, materials that are not chemically reactive, and materials that do not contain any chemical functional group. Specific exemplary materials may include one or more of aluminum trihydrate (ATH), calcium carbonate, polyethylene, polystyrene, and silica.

The particles 225 are preferably held together in the layer 224 with a suitable binder material. However, only a small amount of the binder material is preferably used so the light-scattering layer 224 has a morphology that is microscopically porous. By making the layer 224 porous, the first scattering particles 225 can remain predominantly exposed to air to promote light scattering, and furthermore, liquid material from the melted second solid scattering particles 227 can rapidly wick into and infiltrate the layer 224, for faster responsiveness during printing. A layer can thus be considered porous when it includes a multitude of microscopic gaps between constituent particles that make up the layer. The light-scattering layer 224 may have a thickness in a range from 4 to 20 μm, or other suitable thicknesses.

Adjacent to, and preferably in contact with, the layer 224 is another light-scattering layer 226, which includes the second scattering particles 227. Unlike the particles 225, the particles 227 may be (completely) solid, but like the particles 225 they are also composed of a light-transmissive material. And like the particles 225, the particles 227, when immersed in air, also scatter visible light by one or more of reflection, refraction, and diffraction at the surfaces of the particles. The sizes of the particles 227 may be chosen to optimize or enhance one or both of thermal response time (i.e., minimize or reduce the time needed to melt the particles for a given delivered amount of heat) and visible light scattering. In this regard the particles 227 may preferably have an average size that is similar to or comparable to that of the particles 225. For example, the particles 227 may be tailored to have an average diameter in a range from 0.2 to 1 micrometer.

The particles 227 may be regularly shaped or irregularly shaped. Examples of regularly shaped particles are solid spherical microbeads. An example of irregularly shaped particles is a material that has been ground or pulverized, and then separated using a sieving process or the like to provide the desired size distribution. The light-transmissive material of which the particles 227 are made preferably has a melting point of at least 90° C., but this melting point is also preferably at least 50° C. less than that of the first particles 225.

Light-transmissive materials that are organic, crystalline, and non-polymeric (non-polymeric crystalline organic materials and compounds) are particularly useful due to their ability to rapidly melt. The melting process is accelerated in such materials relative to polymer materials due to the absence of any glass transition temperature, Tg. Exemplary materials for the particles 227 include non-polymeric crystalline organic compounds or materials, materials that are not chemically reactive, materials that do not contain any chemical functional group, and non-thermoplastic materials. Specific exemplary materials may include one or more of diphenyl sulfone (DPS), diphenoxyethane (DPE), ethylene glycol m-tolyl ether (EGTE), and β-naphthylbenzylether (BON). However, in some applications, depending on material cost, availability, or other factors, the second solid scattering particles 227 may be composed of a suitable thermoplastic material or other polymer material, with a suitably low melting point, rather than the more generally preferred non-polymeric materials.

The particles 227 may be held together in the layer 226 with a suitable binder material, and the layer 226 is preferably porous. The light-scattering layer 227 may have a thickness in a range from 4 to 20 μm, or other suitable thicknesses.

Figure 2B:
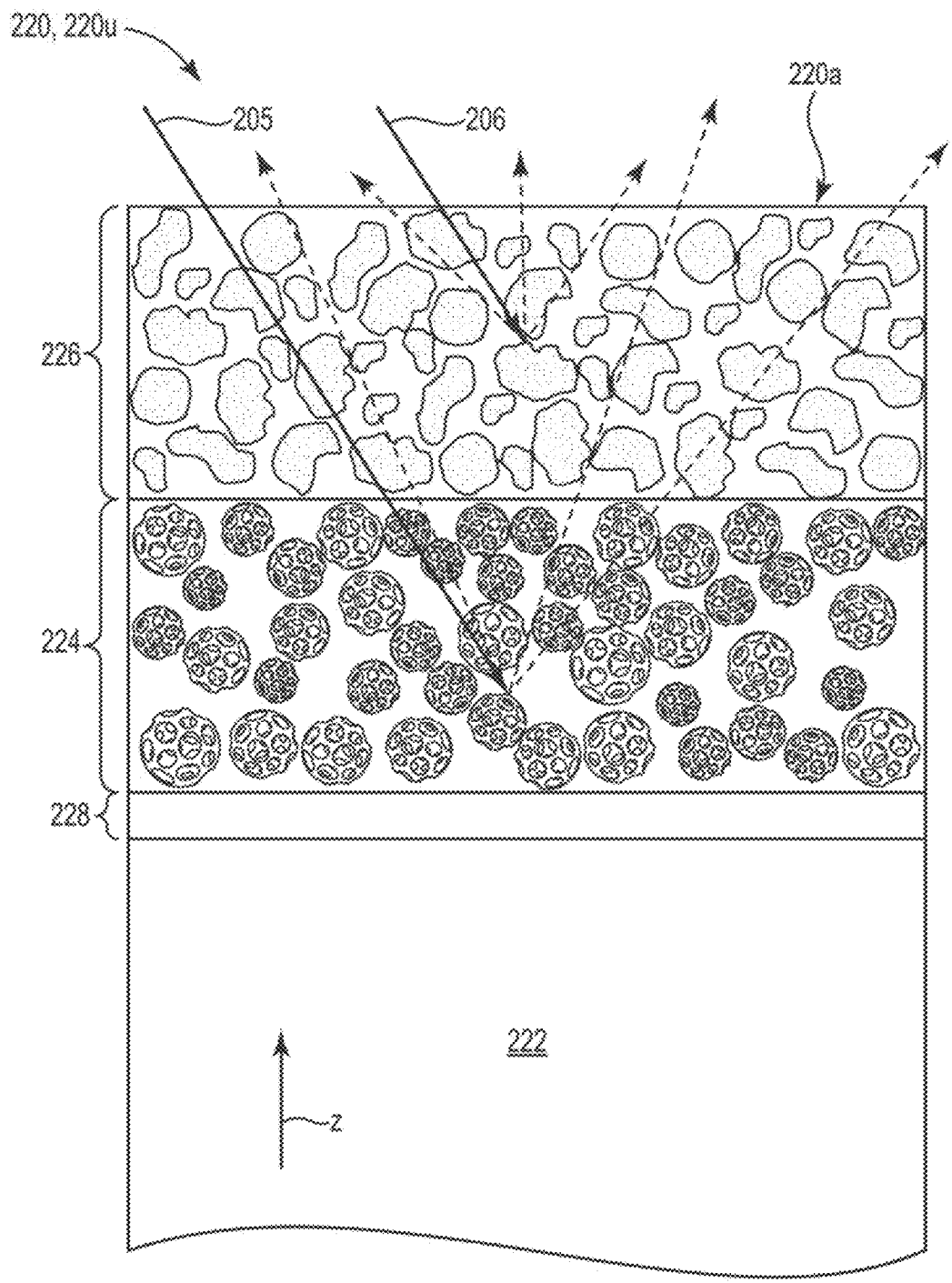
FIG. 2B is a schematic view of the recording medium of FIG. 2A, with simplified light rays drawn to illustrate the light-scattering nature of some of the layers and particles therein.

The same direct thermal recording material 220 (or unprinted portion thereof 220u) shown in FIG. 2A is reproduced in FIG. 2B, along with simplified representations of visible light incident on the product at the exposed major surface 220a. A first visible light ray 205 propagates through the outer light-scattering layer 226 and reaches the inner light-scattering layer 224. There, it encounters one or more of the first scattering particles 225 and is scattered in many directions by one or more of reflection, refraction, and diffraction at surface(s) of the particle(s) 225 exposed to air. A second visible light ray 206 propagates only part of the way through the outer light-scattering layer 226, and encounters in that layer 226 one or more of the second scattering particles 227. This encounter results again in light scattered in many directions by one or more of reflection, refraction, and diffraction at surface(s) of the particle(s) 227 exposed to air. Of course, a given light ray may experience multiple scattering events as it propagates through the layer(s) 224, 226.

As a result of the light scattering by the particles 225, 227, the colorant disposed in or on the thermal insulating layer 228 is not substantially visible to an observer located on a side of the recording material 220 corresponding to the major surface 220a. Stated differently, such an observer, when looking at or towards the major surface 220a of the recording material, would see only the white or light-colored appearance created by the scattering action of the particles 225, 227, rather than the black or dark-colored appearance of the underlying colorant. The white or lighter appearance may be referred to as the background color of the recording material 220.

Figure 2C:
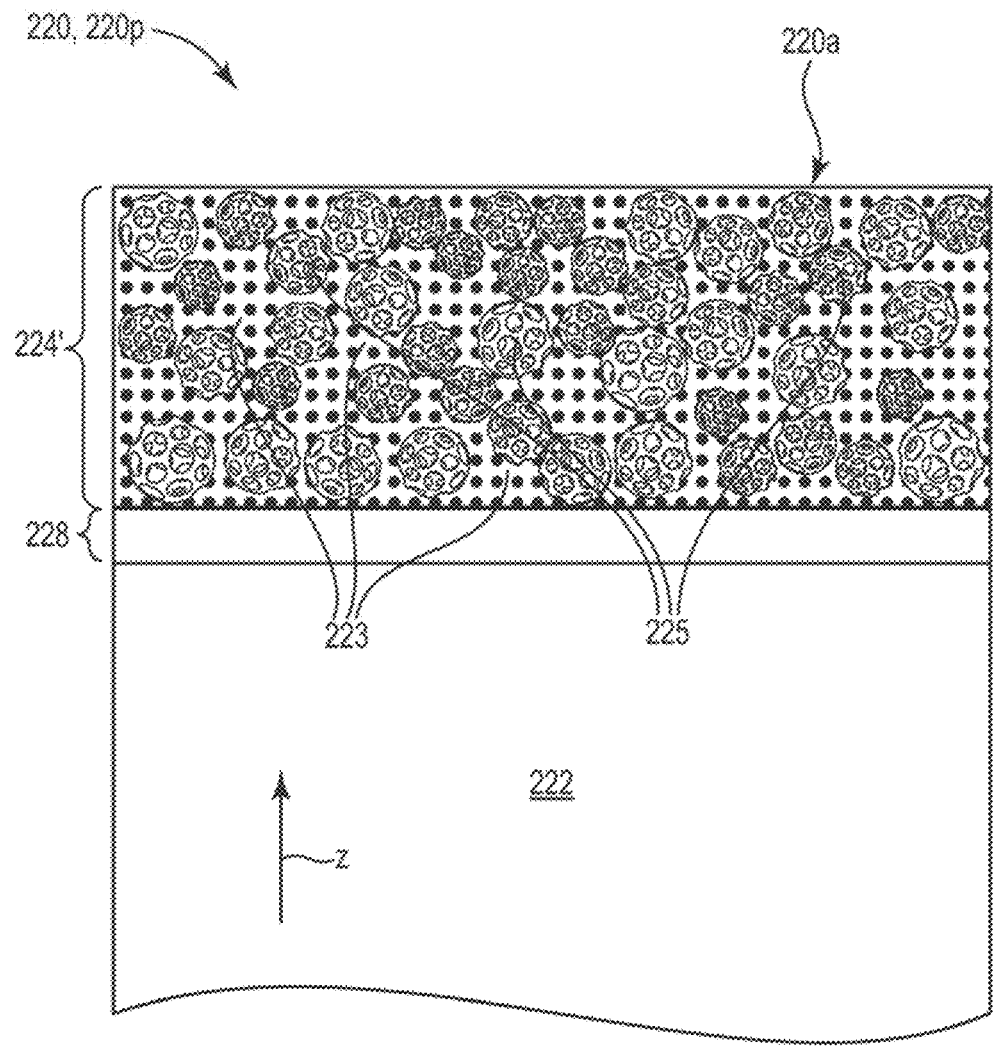
FIG. 2C is a schematic view of the recording medium of FIG. 2A after being modified by treatment with sufficient heat to melt the low melting point scattering particles but not the higher melting point scattering particles.

The direct thermal recording material 220 undergoes a transformation when subjected to sufficient heat and pressure, for a sufficient amount of time, from a thermal print head such as print head 140. In this transformation, the side of the recording medium on which the first light-scattering layer is disposed is heated to a temperature between the melting points of the particles 225, 227, such that only the second particles 227 melt. The first particles 225 preferably do not substantially melt, flatten, collapse, or otherwise deform. Due to the proximity of the second particles 227 to the first particles 225 and the porosity of the first light-scattering layer 224, the melted particles rapidly flow into and fill some or substantially all of the spaces between the first particles 225, as well as inside the empty interiors of such particles. Upon cooling (after passing the thermal print head), the melted particles form a solid matrix material 223 as shown in FIG. 2C. Comparison of FIG. 2C with FIGS. 2A, 2B illustrates that the transformation is characterized by the elimination of the (outer) light-scattering layer 226, and a conversion of the particles 227 from that layer into the matrix material 223 in the (inner) light-scattering layer 224. In practice, the light-scattering layer 226 may not be entirely eliminated, and only a portion of the second particles 227 may melt, and may fill only some of the spaces between and within the first particles 225.

The portion of the direct thermal recording material 220 that undergoes the transformation can be referred to as a printed portion of the recording material. As such, the recording material 220 is also labeled 220p in FIG. 2C. Furthermore, the light-scattering layer originally labeled 224 in FIGS. 2A and 2B is labeled 224' in FIG. 2C to reflect the fact that it has been modified by the addition of the matrix material 223.

The matrix material 223 is of course composed of the same light-transmissive material that originally formed the second scattering particles 227 (FIGS. 2A, 2B). This material is selected to have a refractive index for visible light that is closer to the refractive index of the first particles 225 than air. Stated differently, if n1 is the visible light refractive index for the first particles 225, and n2 is the visible light refractive index for the second particles 227 (and thus also for the matrix material 223), then $|n2-n1|<n1$. For some material choices, the visible light refractive indices for the two particle types may be the same or nearly the same, such that $|n2-n1|\approx 0$. In any of these cases, the reduced refractive index difference causes the reflectivity at the surfaces of the first particles 225 to be significantly reduced, which in turn greatly reduces—and in some cases substantially eliminates—the light scattering behavior of the first particles 225. As a result, the modified layer 224' may exhibit little or no light scattering, such that it becomes substantially transparent. This is illustrated in FIG. 2D.

Figure 2D:
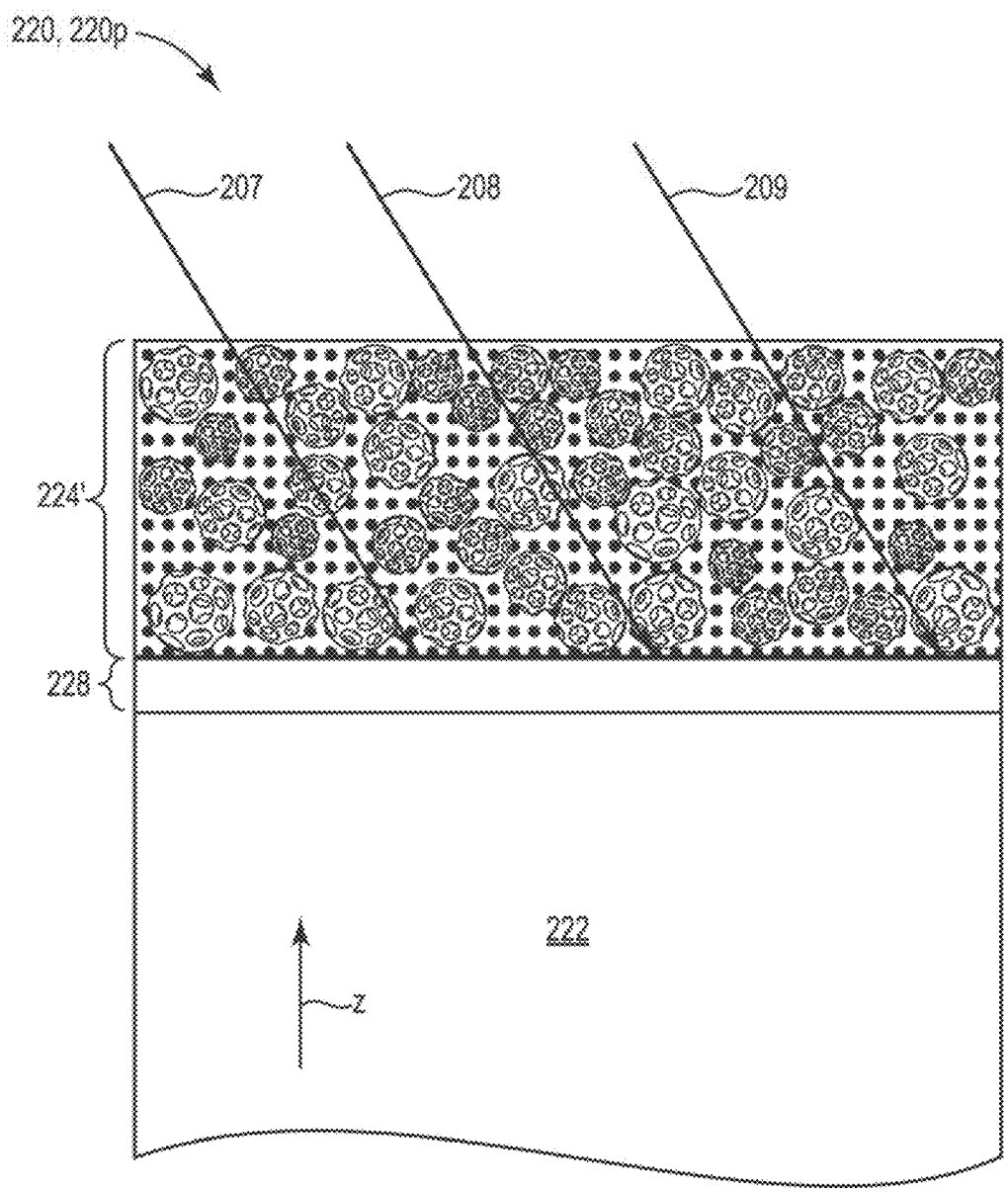
FIG. 2D is a schematic view of the modified recording medium of FIG. 2C, with simplified light rays drawn to illustrate how the light-scattering layer has become substantially transparent.

The same direct thermal recording material 220 (or printed portion thereof 220p) shown in FIG. 2C is reproduced in FIG. 2D, along with simplified representations of visible light incident on the product at the exposed major surface. First, second, and third visible light rays 207, 208, 209 strike the outer major surface and propagate through the modified layer 224'. Little or no scattering of the light rays occurs despite the presence of the first particles 225 in the layer 224', for the reasons discussed above. As a result, the light rays reach, and impinge upon, the colorant which is present in or on the thermal insulating layer 228. This renders the colorant clearly visible as a dark mark or area, on an otherwise white or light background, to an observer or user of the recording material 220.

Figure 3:
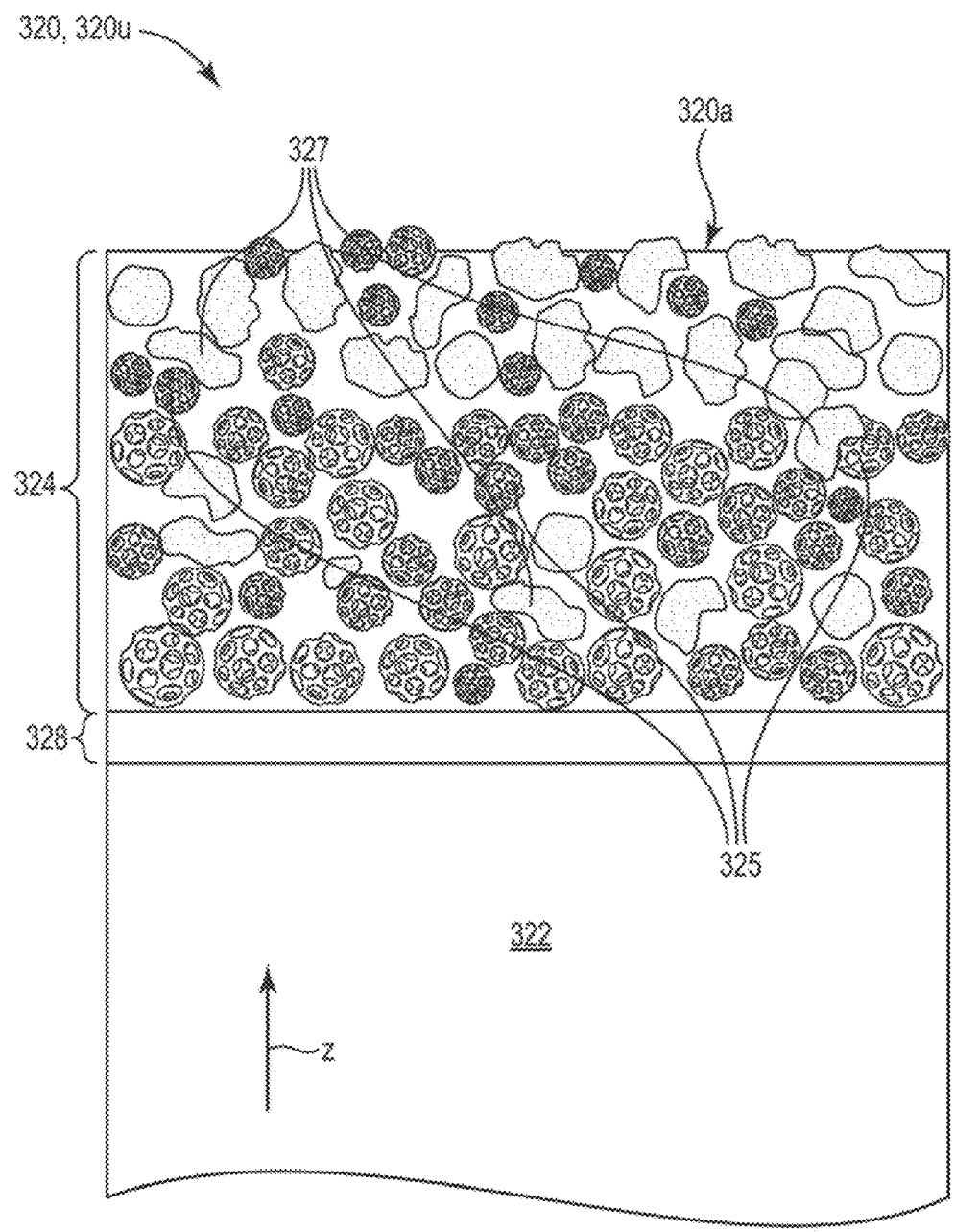
FIG. 3 is a schematic front elevation view, which also serves as a schematic cross-sectional view, of a recording material or medium, or portion thereof, having a so-called monolayer construction.

In the embodiment of FIG. 2A, the first and second scattering particles 225, 227 are separated into distinct but adjacent light-scattering layers. The embodiment of FIG. 2A may thus be said to have a bi-layer construction. An alternative to this is to mix the two types of scattering particles together in a single layer, i.e., in a monolayer. Such an approach can simplify the manufacturing process by eliminating one of the coating steps. A direct thermal recording material 320 having this single light-scattering layer construction is shown in FIG. 3. The recording material 320 is intended to represent the recording material after manufacture but before ever being processed through a thermal printer. The recording material of FIG. 3 may however also represent the recording material after processing through a thermal printer, but at a location that was not substantially subjected to heat from the print head. FIG. 3 may thus also be considered to represent an unprinted portion 320u of a direct thermal recording material. The recording material 320 has opposed major surfaces exposed to air, one of which is labeled as major surface 320a.

The recording material 320 (320u) includes a substrate 322, a light-scattering layer 324, and a thermal insulating layer 328 between the light-scattering layer 324 and the substrate 322. A colorant (not shown separately) is preferably included in or on the thermal insulating layer 328. The light-scattering layer includes first scattering particles 325. The recording material 320 also includes second scattering particles 327 proximate the light-scattering layer 324. In this case, the second scattering particles 327 are included in, and dispersed throughout, the light-scattering layer 324 along with the first particles 325, rather than being in a separate layer.

Features or elements of the recording material 320 that have counterparts in the recording material 220 of FIG. 2A may be the same as or similar to such counterpart or corresponding elements. Thus, for example, the substrate 322, first scattering particles 325, second scattering particles 327, and thermal insulating layer 328 may be the same as or similar to the substrate 222, first particles 225, second particles 227, and insulating layer 228, respectively, discussed above.

Furthermore, the light-scattering layer 324 may also be similar to the layer 224 discussed above, except that the second scattering particles are present in the layer 324. The particles 325, 327 may thus be held together in the layer 324 with a suitable binder material, and the light-scattering layer 324 may have a porous morphology. By making the layer 324 porous, both types of scattering particles 325, 327 can remain predominantly exposed to air to promote light scattering. As a result of the light scattering by the particles 325, 327, the colorant disposed in or on the thermal insulating layer 328 is not substantially visible to an observer located on a side of the recording material 320 corresponding to the major surface 320a, and the observer would see only the white or light-colored appearance created by the scattering action of the particles 325, 327.

And just as in the bi-layer embodiment, the first and second scattering particles 325, 327 of the monolayer embodiment have different melting points: the melting point of the second particles 327 is preferably at least 90° C., or in a range from 80 to 150° C., and the melting point of the first particles 325 is preferably at least 50° C. greater than that of the second particles 327. Thus, when sufficient heat is applied to the top side of the recording material 320, the second scattering particles 327, but not the first scattering particles 325, melt and fill spaces between (and within) the first scattering particles, which renders the light-scattering layer 324 substantially transparent. Also, when passing the recording material 320 through a conventional thermal printer, the second scattering particles 327, but not the first scattering particles 325, rapidly melt and, upon melting, fill spaces between and within the first scattering particles to render the light-scattering layer 324 substantially transparent.

The recording material 320 thus also undergoes a transformation when subjected to sufficient heat and pressure, for a sufficient amount of time, from a thermal print head. The side of the recording medium on which the light-scattering layer is disposed is heated to a temperature between the melting points of the particles 325, 327, such that only the second particles 327 melt. The first particles 325 preferably do not substantially melt, flatten, collapse, or otherwise deform. The melted particles rapidly flow into and fill some or substantially all of the spaces between the first particles 325, as well as inside the empty interiors of such particles. Upon cooling (after passing the thermal print head), the melted particles form a solid matrix material in which the first particles 325 are immersed, substantially as shown previously in FIG. 2C. In practice, only a portion of the second particles 327 may melt, and may fill only some of the spaces between and within the first particles 325. The portion of the direct thermal recording material 320 that undergoes the transformation can be referred to as a printed portion of the recording material.

By interspersing the first and second particles 325, 327 together in a single layer, we reduce the average distance between melted second particles 327 and their nearest neighbor spaces between the first particles 325. This reduced average distance can reduce the response time to achieve transparency, and enable the monolayer recording material 320 to operate at faster printing speeds, e.g. as measured in inches per second (ips). The light-scattering layer 324 may have a thickness in a range from 4 to 40 µm, or 6 to 30 µm, or other suitable thicknesses. The relative proportions of first particles 325 and second particles 327 contained in the light-scattering layer 324 can be selected as desired; however, we have found that a ratio of the first solid scattering particles to the second solid scattering particles, measured in terms of total dry solids (by weight), is preferably in a range from 1 to 3, or from 1.5 to 2.5. The light-scattering layer may consist essentially of the first scattering particles, the second scattering particles, a binder, and an optional lubricant. The first scattering particles, the second scattering particles, and the binder may make up at least 95% (total dry solids) of the light-scattering layer.

Besides the bi-layer embodiment of FIG. 2A and the monolayer embodiment of FIG. 3, we also contemplate hybrid embodiments in which some low melting point scattering particles (second particles) are interspersed with high melting point scattering particles (first particles) in a first porous light-scattering layer, and additional low melting point scattering particles are included in a separate light-scattering layer adjacent the first layer.

Embodiments of the type shown in FIGS. 2A and 3 may contain no, or substantially no, hollow scattering particles such as hollow sphere pigments (HSP) in the light-scattering layers 224, 226, and 324. In some cases, however, it may be beneficial to include some hollow scattering particles in the light scattering layer(s). One reason for doing so relates to the problem of liquid or oil contamination of the recording material. It is common for direct thermal recording media to be used as receipts, tickets, or labels, and the hands or fingers of persons handling such items can sometimes be wet, greasy, oily, or sweaty. If enough of such a liquid contaminant were to contact the exposed major surface 220a of FIG. 2A, or the surface 320a of FIG. 3, the liquid could wick and penetrate into the porous light scattering layer(s), rendering such layer(s) substantially transparent and thus causing unprinted, wetted areas of the recording material to change appearance from white to black (or otherwise dark), which could cause any previously printed image in such areas to become difficult or impossible to discern. Unlike solid scattering particles or particles having a perforated morphology, hollow scattering particles maintain most, or at least a substantial portion, of their light scattering capability when they are immersed in a liquid or molten material of similar refractive index. Thus, by including a controlled amount of hollow scattering particles in the light-scattering layer(s) of the disclosed recording materials, the liquid contaminant problem can be improved by ensuring that some light scattering still occurs in unprinted regions of the recording material that are wetted with the liquid.

Figure 4:
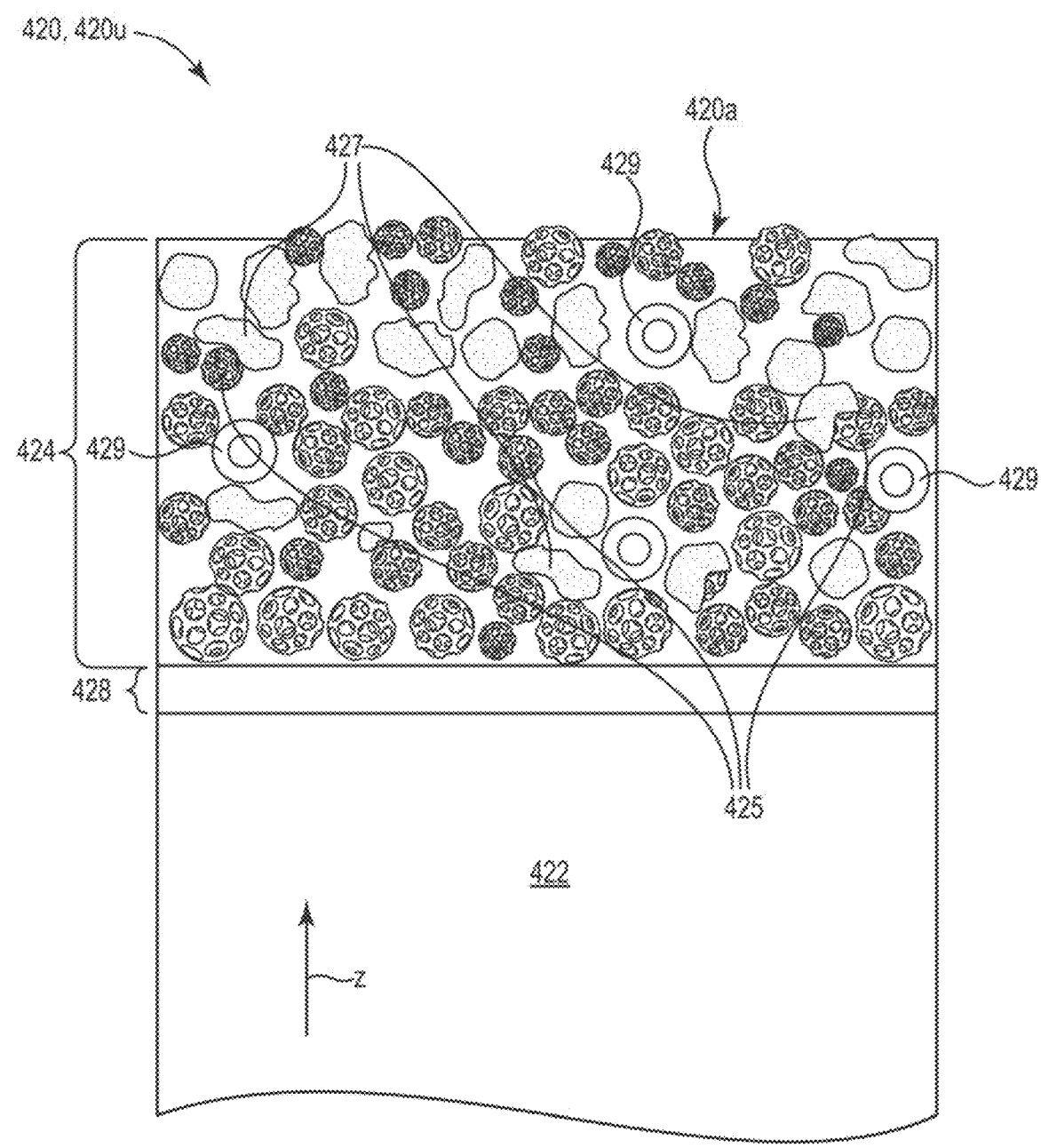
FIG. 4 is a schematic front elevation view, which also serves as a schematic cross-sectional view, of a recording material or medium, or portion thereof, similar to that of FIG. 3, but where the light scattering monolayer includes, in addition to first and second scattering particles, some hollow sphere particles, also called hollow sphere pigments.

With this in mind, FIG. 4 shows a direct thermal recording material 420 which is similar to that of FIG. 3, except that some of the first scattering particles have been replaced by hollow scattering particles. The recording material 420 is intended to represent the recording material after manufacture but before ever being processed through a thermal printer, but may also represent the recording material after processing through a thermal printer, but at a location that was not substantially subjected to heat from the print head. FIG. 4 may thus also be considered to represent an unprinted portion 420u of a direct thermal recording material. The recording material 420 has opposed major surfaces exposed to air, one of which is labeled as major surface 420a.

The recording material 420 (420u) includes a substrate 422, a light-scattering layer 424, and a thermal insulating layer 428 between the light-scattering layer 424 and the substrate 422. A colorant (not shown separately) is preferably included in or on the thermal insulating layer 428. The light-scattering layer includes first scattering particles 425. The recording material 420 also includes second scattering particles 427 proximate the light-scattering layer 424. The second scattering particles 427 are included in, and dispersed throughout, the light-scattering layer 424 along with the first particles 425. Furthermore, the light-scattering layer 424 also includes hollow (or HSP) light-scattering particles 429 dispersed throughout the layer 424 for the reasons mentioned above. Preferably, to balance the advantages and disadvantages of having hollow scattering particles present in the light-scattering layer, only a controlled or limited amount of such hollow particles are included. For example, the light-scattering layer 424 may contain hollow scattering particles in an amount from 5% to 20% (total dry solids).

Features or elements of the recording material 420 that have counterparts in the recording materials of FIGS. 2A and 3 may be the same as or similar to such counterpart or corresponding elements. Thus, for example, the substrate 422, first scattering particles 425, second scattering particles 427, and thermal insulating layer 428 may be the same as or similar to the substrate 322, first particles 325, second particles 327, and insulating layer 328, respectively, described above. Furthermore, the light-scattering layer 424 may also be similar to the layer 324 discussed above, except that some hollow scattering particles 429 are present in the layer 424.

The hollow scattering particles 429 are preferably composed of a transparent material. The hollow particles 429 are also preferably of a size that is similar to that of one or both of the particles 425, 427. Exemplary hollow particles 429 may be or comprise Ropaque brand EF-500 pigment available from The Dow Chemical Company, or any of the other Ropaque brand of pigments, or the like. The hollow polymeric sphere pigment may have an average particle size (average diameter) of 0.4 micrometers, or in a range from 0.4 to 1.6 micrometers. The hollow polymeric sphere pigment may also have a void volume of 55%, or in a range from 50 to 60%.

The particles 425, 427, 429 may be held together in the layer 424 with a suitable binder material, and the light-scattering layer 424 may have a porous morphology. As a result of light scattering by the particles 425, 427, 429, the colorant disposed in or on the thermal insulating layer 428 is not substantially visible to an observer located on a side of the recording material 420 corresponding to the major surface 420*n*, and the observer would see only the white or light-colored appearance created by the scattering action of the particles 425, 427, 429.

The first and second scattering particles 425, 427 have different melting points: the melting point of the second particles 427 is preferably at least 90° C., or in a range from 80 to 150° C., and the melting point of the first particles 425 is preferably at least 50° C. greater than that of the second particles 427. The melting point of the hollow scattering particles 429 is also preferably substantially greater than that of the second particles 427, e.g., at least 50° C. greater similar to the first particles. When sufficient heat is applied to the top side of the recording material 420, the second scattering particles 427, but not the first scattering particles 425 and not the hollow scattering particles 429, melt and fill spaces between and within the first scattering particles and between the hollow scattering particles 429, which renders the light-scattering layer 424 substantially transparent as long as the amount of hollow particles 429 is sufficiently low. When passing the recording material 420 through a conventional thermal printer, the second scattering particles 427, but not the first scattering particles 425 and not the hollow scattering particles 429, rapidly melt and, upon melting, fill spaces between and within the first solid scattering particles, and between the hollow scattering particles, to render the light-scattering layer 424 substantially transparent.

Similar to the other embodiments, the recording material 420 undergoes a transformation when subjected to sufficient heat and pressure, for a sufficient amount of time, from a thermal print head. The side of the recording medium on which the light-scattering layer is disposed is heated to a temperature between the melting points of the particles 425, 427, such that only the second particles 427 melt. The first particles 425, as well as the hollow particles 429, preferably do not substantially melt, flatten, collapse, or otherwise deform. The melted particles rapidly flow into and fill some or substantially all of the spaces between the unmelted particles. Upon cooling (after passing the thermal print head), the melted particles form a solid matrix material in which the first particles 425 and hollow particles 429 are immersed, in similar fashion to FIG. 2C. In practice, only a portion of the second particles 427 may melt, and may fill only some of the spaces between the other particles. The portion of the direct thermal recording material 420 that undergoes the transformation can be referred to as a printed portion of the recording material.

Figure 5:
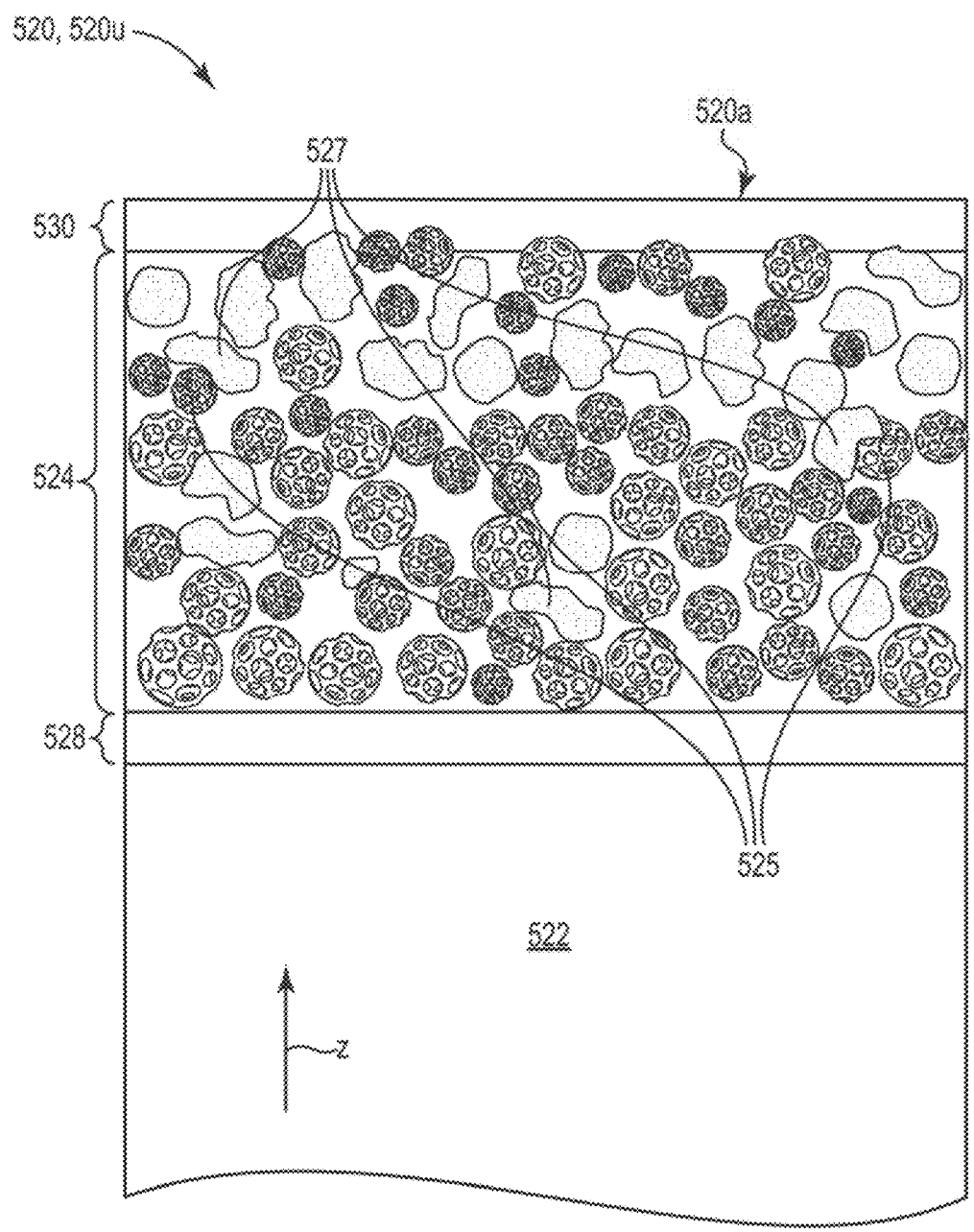
FIG. 5 is a schematic front elevation view, which also serves as a schematic cross-sectional view, of a recording material or medium, or portion thereof, similar to that of FIG. 3, but further including a protective top coat.

Other layers, coatings, and agents can be added to or otherwise included in the disclosed direct thermal recording materials. One such option is a topcoat. A topcoat can be applied to the outermost surface of the recording material, and can protect underlying layers of the recording material from unwanted contaminants or substances. For example, a topcoat can effectively seal a porous light-scattering layer against seepage by oils or other unwanted liquids. In that regard, a topcoat can circumvent the need to add hollow scattering particles as discussed above in connection with FIG. 5. An embodiment of a recording material having such a topcoat is shown in FIG. 5.

In that figure, a direct thermal recording material 520 is shown that is similar to the recording material 320 of FIG. 3, except that a topcoat has been applied to the outermost major surface. The recording material 520 is intended to represent the recording material after manufacture but before ever being processed through a thermal printer, but may also represent the recording material after processing through a thermal printer, but at a location that was not substantially subjected to heat from the print head. FIG. 5 may thus also be considered to represent an unprinted portion 520*u* of a direct thermal recording material. The recording material 520 has opposed major surfaces exposed to air, one of which is labeled as major surface 520*a*.

The recording material 520 includes a substrate 522, a light-scattering layer 524, and a thermal insulating layer 528 between the light-scattering layer 524 and the substrate 522. A colorant is preferably included in or on the thermal insulating layer 528. The light-scattering layer includes first scattering particles 525. The recording material 520 also includes second scattering particles 527 proximate the light-scattering layer 524. The second scattering particles 527 are included in, and dispersed throughout, the light-scattering layer 524 along with the first particles 525. No hollow scattering particles are present in the light-scattering layer 524, however, some may be included if desired. Significantly, the recording material 520 includes a topcoat 530, which may be the outermost layer of the article, and which protects underlying layers of the article.

Features or elements of the recording material 520 that have counterparts in the recording materials of the previously described embodiments may be the same as or similar to such counterpart or corresponding elements. Thus, for example, the substrate 522, light-scattering layer 524, first scattering particles 525, second scattering particles 527, and thermal insulating layer 528 may be the same as or similar to the substrate 322, light-scattering layer 324, first particles 325, second particles 327, and insulating layer 328, respectively, described above.

The topcoat 530 may be any suitable topcoat of conventional design. The topcoat 530 may for example comprise binders such as modified or unmodified polyvinyl alcohols, acrylic binders, crosslinkers, lubricants, and fillers such as aluminum trihydrate and/or silicas. The topcoat 530 may have a thickness in a range from 0.5 to 2 µm, or other suitable thicknesses.

The functionality of the recording material 520 in the presence of a thermal print head, with regard to the selective change of state of the second scattering particles relative to the first scattering particles, may be substantially the same as that described above in connection with FIG. 3, and will not be repeated here.

Other properties can also be incorporated into the disclosed direct thermal recording materials. One such property is heat stability for microwave applications and the like. Another property is resistance to strong chemical solvents.

With regard to heat stability, there are some applications in which the direct thermal recording material, after being printed, is likely to experience a heated environment substantially above ambient room temperature. One such application may be where the recording material is in the form of a label attached to a food item that is meant to be heated or cooked in a microwave oven, for example. Another application may be where the recording material is in the form of a label for attachment to a cup or container of coffee or other hot beverage. In applications such as these, it would be undesirable for the entire label (or other piece of direct thermal recording material at issue), as a result of the elevated temperature of its surroundings, to change to black, thus rendering any previously printed information unreadable. A solution to this problem is to select materials for the first and second scattering particles whose melting temperatures are sufficiently high to withstand such environments, while still low enough (in the case of the second scattering particles) to melt under the influence of the thermal print head. Thus, for example, we may select second scattering particles whose melting point is substantially above 100° C., yet also substantially below 200° C., while simultaneously selecting first scattering particles whose melting point is at least 50° C. higher than that of the second particles. One suitable combination in this regard is to choose diphenyl sulfone (DPS) as the light-transmissive material for the second scattering particles, and polystyrene as the light-transmissive material for the first scattering particles. The melting points of these materials are roughly 127° C. for DPS, and 240° C. for polystyrene. Other material combinations are also of course possible.

With regard to solvent resistance, there are some applications in which the direct thermal recording material, after being printed, is likely, or at least has the potential, to be exposed to strong chemical solvents such as isopropanol, ethanol, methanol, acetone, toluene, or the like. To the extent such solvents, or even vapors from such solvents, can dissolve or otherwise attack the first or second light-scattering particles of the disclosed embodiments, they can transform an entire label (or other piece of direct thermal recording material at issue) to the black or dark color of the colorant, rendering any previously printed information unreadable. A solution to this problem is to select materials for the first and second scattering particles that are impervious to attack by such solvents, while satisfying the other requirements described above for these materials.

The disclosed recording materials may also incorporate other known layers, coatings, and materials. Optical brighteners may for example be used to improve the whiteness of the background color of the recording materials. Lubricants can be used to reduce friction between the recording material and the thermal print head. Slip agents can be used to improve print head matching characteristics. Adhesive layers, including but not limited to pressure sensitive adhesives (PSAs) or hot melt adhesives, can be included on the back of the recording material to allow attachment to containers, films, or other bodies. Release liners can be included to cover a PSA layer until ready for use. Release coatings may also be applied to the surface for linerless applications that do not require a liner. Furthermore, digital ink receptive layers maybe applied to surface(s) of the recording material, such as exposed major surfaces 220a, 320a, 420a, or 520a.

Numerous modifications can be made to the disclosed recording materials. We teach above, for example, that the scattering particles can be regularly or irregularly shaped. Besides this, one or both types of particles can be characterized in terms of their particle morphology, i.e., the characteristic form or shape of the individual particles in a given particle group. In a simple morphology, a given particle may have a topographical boundary defined by a single, closed outer surface—which may be regular or irregular, smooth or jagged—and a uniform or substantially uniform material composition within the bounds of that outer surface. The second particles in FIGS. 2A-2D, 3, 4, and 5, for example, are shown as having a simple morphology. Solid, homogeneous microspheres also have a simple morphology. Some of the scattering particles disclosed herein can have non-simple morphologies, which we refer to as complex morphologies.

Figure 6:
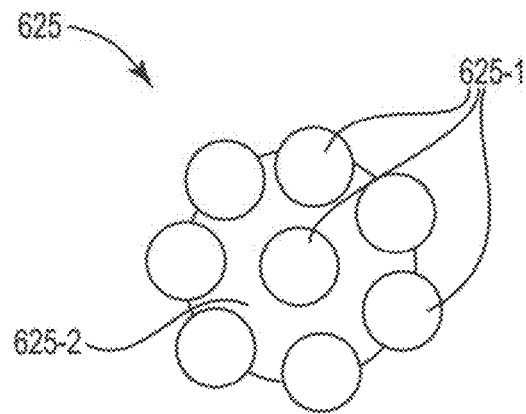
FIG. 6 is a schematic side, top, or bottom view of a particle having a type of complex morphology known as a drupelet morphology.

One such complex morphology is an agglomerated particle, some examples of which are discussed in U.S. Pat. No. 9,663,650 (Jhaveri). A given particle in these cases may thus be a solid agglomeration of at least two types of sub-particles. Small sub-particles composed of a first material may for example be embedded or partially embedded in a larger sub-particle composed of a different second material. In the case of Jhaveri, the first material is a hydrophilic polymer having a first glass transition temperature (Tg), and the second material is hydrophobic polymer having a higher, second Tg. The resulting agglomerated particle may have a drupelet-like surface morphology resembling (on a microscopic scale) that of a blackberry or raspberry, not only in shape but in surface definition, with at least part of at least some of the smaller sub-particles protruding from the surface of the larger sub-particle to give the surface a bumpy, raspberry-like, or blackberry-like appearance. A schematic illustration of a particle having a complex morphology, in particular a drupelet morphology, is shown in FIG. 6. There, a solid agglomerated light-scattering particle 625 is composed of sub-particles 625-1 of a first light-transmissive material partially embedded in a larger sub-particle 625-2 of a different second light-transmissive material. The smaller sub-particles protrude from the surface of the larger sub-particle to provide a bumpy, raspberry-like, or blackberry-like appearance.

Hollow sphere particles or HSP would also be considered to have a complex, though radially symmetric, morphology. Perforated particles such as those of FIG. 1C would also be considered to have a complex morphology.

EXAMPLES

In accordance with the foregoing teachings, a number of direct thermal recording media samples were fabricated and tested.

Bulk quantities of perforated particles similar to that of FIG. 1C were obtained from OMNOVA Solutions Inc., Beachwood, Ohio, under product code Lytron EV. A layer of such particles was coated onto a substrate and inspected under a scanning electron microscope (SEM), and compared to a comparable layer of conventional HSP particles. The results are shown in the freeze fracture images of FIGS. 7A (HSP particles) and 7B (perforated particles). FIG. 7A shows the layer of HSP particles, some of which have broken apart as a result of sample preparation. FIG. 7B shows the layer of perforated particles; some of these too have broken apart also due to sample preparation. The measurement capability of the SEM was used to measure the diameter of a representative HSP particle, and the result was about 1.24 micrometers. The same measurement was taken of a representative perforated particle, and the result was about 1.26 micrometers. The particle sizes of the two types of particles were thus comparable, for the particles that were tested. The perforated or cage-like morphology of the perforated particles can easily be observed in FIG. 7B, and is very different from the smooth bead-like morphology of the HSP particles in FIG. 7A.

The commercially available perforated particles of FIG. 7B are made with a light-transmissive polymer material whose melting point is substantially above that of DPE. Accordingly, the perforated particles can be readily used as high melting point (first) scattering particles alongside low melting point (second) solid scattering particles made of DPE.

A sample recording material was thus made using the perforated particles. This sample was tested against a sample of similar design but where HSP particles were substituted for the perforated particles. Each sample had a paper substrate, atop which a thermal insulating layer was formed. The thermal insulating layer comprised a mixture of calcinated clay and Ropaque™ TH-1000 hollow sphere pigment along with an SBR binder, at a coat weight of 4.5 g/m². After drying, a light-scattering layer was coated atop the thermal insulating layer. The light-scattering layer comprised both first scattering particles and second solid scattering particles, the first particles having a higher melting point than the second particles, and the second particles being solid scattering particles made of DPE. After the light-scattering layer was dried, no other coatings were applied.

EXAMPLE 1: for the sample referred to as Example 1, the perforated particles (Lytron EV from OMNOVA Solutions Inc.) were used as the first scattering particles. COMPARATIVE EXAMPLE CE: for the sample referred to as a Comparative Example (CE), Ropaque™ TH-1000 HSP (Dow Chemical Co.) were used as the first scattering particles.

Thermal printing was performed on each sample using a Zebra™ thermal printer, model 140Xi3, at a speed of 6 ips unless otherwise stated, and using the default energy setting of the print head, which was 11.7 mJ/mm². In the case of barcode patterns that were later evaluated, these were printed onto the samples using the Zebra™ printer, unless otherwise stated.

Properties of the thermally printed images such as the evaluation of color, e.g. the color of an unprinted area or region on a sample, or the color of a printed area or region on a sample, were measured using a ColorTouch 2 instrument by Technidyne Corporation. This instrument provides measurements of, among other things, CIE whiteness (UV light excluded), and brightness (UV light excluded). Color was also in some cases evaluated with a Gretag Macbeth D19C densitometer, which provides optical density measurements. The quality of barcode patterns was evaluated using a TruCheck™ barcode verifier operating at 650 nm, a passing result corresponding to an ANSI value of 1.5 or more, and a failing result corresponding to an ANSI value of less than 1.5.

A specimen of Example 1 and a specimen of the Comparative Example (CE) were thus thermally printed with a standard barcode image and evaluated. The results are reported in Table 1:

TABLE 1

| Example | barcode ANSI | | | brightness (UV ex.) | optical density (bkgnd) | coat weight (gsm) |
| --- | --- | --- | --- | --- | --- | --- |
| | 6 ips | 8 ips | 10 ips | | | |
| CE | fail | fail | fail | 73.97 | 0.19 | 6 |
| 1 | pass | pass | pass | 82.28 | 0.14 | 6 |

In this table, a "pass" result refers to an ANSI value of 1.5 or more, and a "fail" result refers to an ANSI value of less than 1.5. Brightness, optical density, and coat weight have the meanings described above.

For the samples printed at the 6 ips print speed, vegetable oil was applied to the top surface of the recording material to simulate or confirm the improved penetration mechanism provided by the caged morphology of the perforated particles. Images of the samples so made are shown in FIG. 8A (the Comparative Example CE) and FIG. 8B (Example 1). The superior performance of the perforated particles of Example 1 compared to the HSP particles of the Comparative Example CE is plain to see. Measurement data on these samples is reported in Table 2:

TABLE 2

| | 6 ips barcode data | | Vegetable oil testing (optical density) | |
| --- | --- | --- | --- | --- |
| Example | ANSI | optical density | before | after |
| CE | fail | 0.66 | 0.19 | 0.68 |
| 1 | pass | 1.56 | 0.14 | 1.86 |

Additional examples were then made and tested with other perforated particles as the first scattering particles, and different materials for the second scattering particles. The examples explored the effect of hole size and hole coverage for the perforated particles on the performance of the direct thermal media.

The idealized perforated particle shown in FIG. 1C depicts holes whose sizes or diameters are quite large, each a significant fraction of the size/diameter of the particle itself. (The term "diameter" in this regard is used in its broadest sense to refer to a maximum transverse dimension, and does not imply that the hole, particle, or other thing being measured is spherical or circular.) In connection with holes, we use the term "relative size" or "relative diameter" to refer to the diameter of a hole divided by the diameter of the particle in which it is formed. This ratio can be expressed as a fraction, a decimal, or a percentage.

Another characteristic of interest for perforated particles is the coverage of holes over the outer surface of the particle, i.e., a measure of how much of the outer surface is occupied by holes. We refer to this as "hole coverage". The hole coverage can be measured or approximated from a 2-dimensional projection such as a SEM photograph or 2-dimensional drawing like FIG. 1C by computing the total projected area of the holes that can be seen in such an image and dividing by the projected area of the entire particle in which the holes are present. This ratio can also be expressed as a fraction, a decimal, or a percentage.

We hypothesized that relative size and hole coverage could both be significant factors in the performance of direct thermal media that incorporated perforated particles. Perforated particles with relatively small hole sizes (in relation to the diameter of the particle) might be expected to behave more like ISP particles, which are hollow and not perforated at all, whereas larger hole sizes might be expected to exhibit substantially different properties due to the ability of molten material to flow into and fill the interior of the particle more easily.

But the fraction or percentage of the particle's outer surface taken up by holes (hole coverage) could also be relevant to the product performance. For example, when comparing a particle having only a few holes of a certain size with a particle having many holes of a smaller size, the latter particle may be more effective at allowing molten material to flow into the interior of the particle. Indeed, a particle that has only one hole connecting the outside space to the hollow interior may be substantially impervious to the flow of such molten material, and may behave similarly to an HSP particle.

Figure 10A:
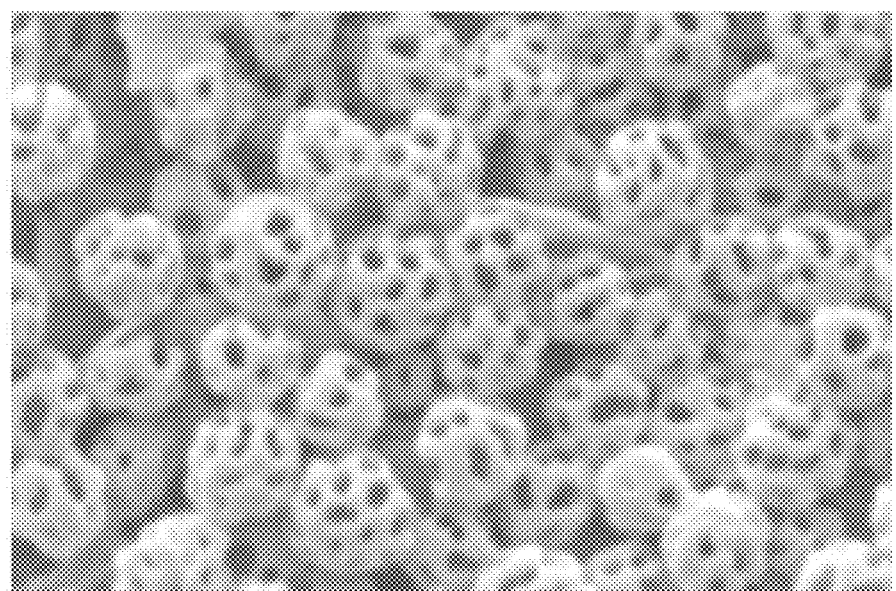
FIGS. 10A, 10B, and 10C are SEM images of different types of perforated particles, the different types having different relative sizes or diameters of the holes in the particles, and different degrees of hole coverage.
Figure 10B:
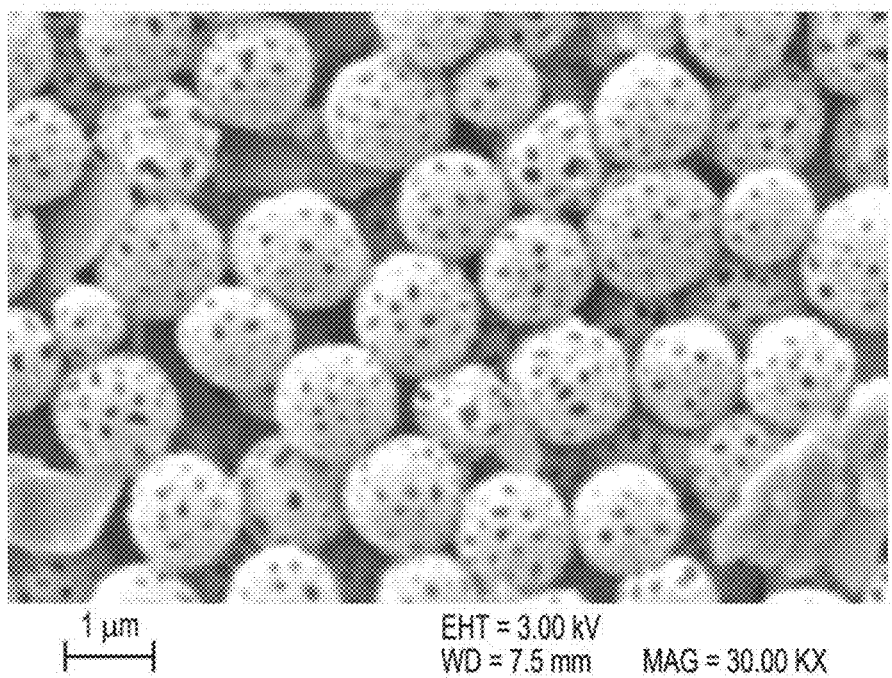
Figure 10C:
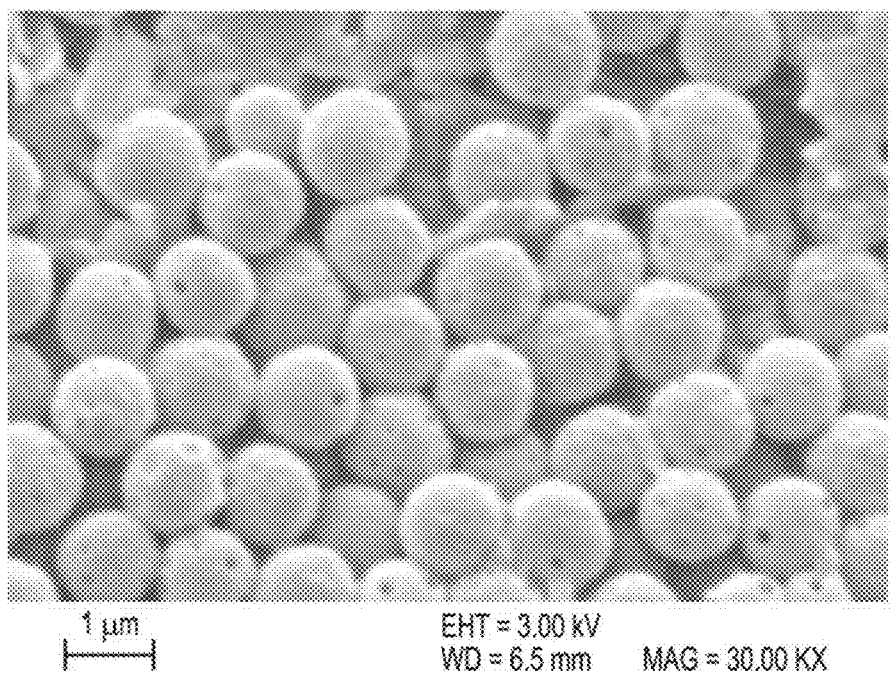

We therefore obtained perforated particles that differed in these parameters, and used them to produce different example recording materials whose performance we tested and compared. The different types of perforated particles were obtained from OMNOVA Solutions Inc., Beachwood, Ohio, A first type, shown in the SEM image of FIG. 10A, was sold under product code Lytron EV. According to our measurements, this type of perforated particle had an average particle size (diameter) of 1 micrometer, and holes whose relative size (diameter) was 25% (i.e., the average hole size was 250 nm) and whose hole coverage was 60%. A second type of perforated particle is shown in the SEM image of FIG. 10B. This second type of perforated particle was made by the same manufacturer as the first type, and had the same material composition as the first type, but with smaller holes. According to our measurements, this type of perforated particle had an average particle size of 1 micrometer, and holes whose relative size was 12.5% (i.e., the average hole size was 150 nm) and whose hole coverage was 40%. A third type of perforated particle is shown in the SEM image of FIG. 10C. This third type of perforated particle was made by the same manufacturer as the first and second types, and had the same material composition as those types, but with even smaller holes. According to our measurements, this type of perforated particle had an average particle size of 1 micrometer, and holes whose relative size was 4% (i.e., the average hole size was 40 nm) and whose hole coverage was 30%.

Figure 9:
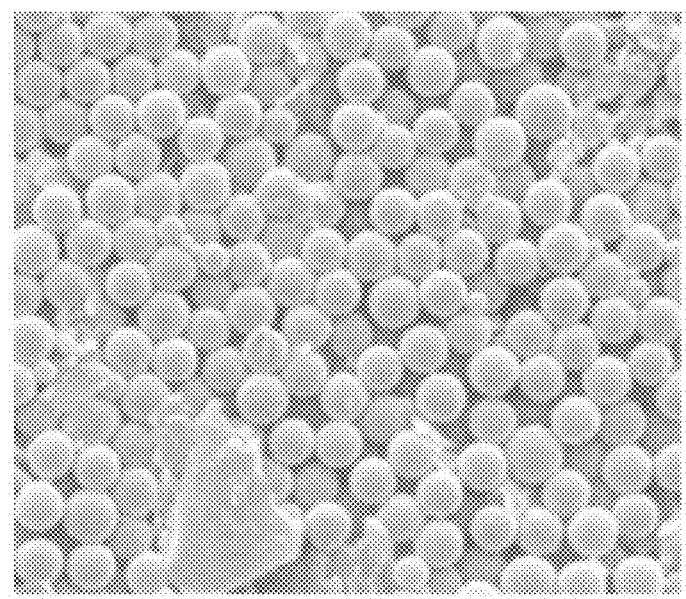
FIG. 9 is another SEM image of HSP particles.

For comparative purposes, Ropaque™ TH-1000 hollow sphere pigment, sold by The Dow Chemical Company, was also obtained, shown in the SEM image of FIG. 9. These (non-perforated) particles had an average particle diameter of nominally 1 micrometer, but measured at about 1.2 micrometers.

In preparation for making the example recording materials, a number of dispersion formulations were prepared.

One dispersion, referred to as Dispersion 1A, had the following formulation, where all parts or percentages are understood to be parts per weight, and where the "first" scattering particle for this dispersion refers to Ropaque™ TH-1000 hollow sphere pigment particles (see FIG. 9), at 27% solids:

| Dispersion 1A Formulation | |
|---|---|
| Material | Parts |
| "first" scattering particle | 40.0 |
| binder, 20% solution of polyvinyl alcohol in water | 20.0 |
| defoaming and dispersing agents | 0.4 |
| water | 39.6 |

Another dispersion, referred to as Dispersion 1B, was the same as Dispersion 1A except that the "first" scattering particle was the first type of perforated particles (see FIG. 10A) at 17% solids.

Another dispersion, referred to as Dispersion 1C, was the same as Dispersions 1A and 1B, except that the "first" scattering particle was the second type of perforated particles (see FIG. 10B) at 17% solids.

Another dispersion, referred to as Dispersion 1D, was the same as Dispersions 1A, 1B, and 1C, except that the "first" scattering particle was the third type of perforated particles (see FIG. 10C) at 17% solids.

A Dispersion 2A was also made. This dispersion had the following formulation, where all parts or percentages are understood to be parts per weight, and where the "second" scattering particle for this dispersion refers to solid particles of 1,2-diphenoxy ethane ("DPE") having an average size (diameter) of ~0.3 μm:

| Dispersion 2A Formulation | |
|---|---|
| Material | Parts |
| "second" scattering particle | 40.0 |
| binder, 20% solution of polyvinyl alcohol in water | 20.0 |
| defoaming and dispersing agents | 0.4 |
| water | 39.6 |

Another dispersion, referred to as Dispersion 2B, was the same as Dispersion 2A except that the "second" scattering particle was solid particles of ethylene glycol m-tolyl ether ("EGTE") having an average size (diameter) of ~0.3 μm.

Another dispersion, referred to as Dispersion 2C, was the same as Dispersions 2A and 2B, except that the "second" scattering particle was solid particles of diphenyl sulfone ("DPS") having an average size (diameter) of ~0.3 μm.

Samples of direct thermal recording materials were then made using these dispersions. In each case, the sample used a paper substrate, atop which a thermal insulating layer was formed. The thermal insulating layer comprised a mixture of calcinated clay and Ropaque™ TH-1000 hollow sphere pigment along with an SBR binder, at a coat weight of 4.5 g/m². After drying, a light-scattering layer was coated atop the thermal insulating layer using combinations of the above dispersions. The light-scattering layer comprised both first scattering particles and second solid scattering particles, the first particles having a higher melting point than the second particles, and the second particles being solid scattering particles. After the light-scattering layer was dried, no other coatings were applied. The light-scattering layer was applied at a coat weight of 6 grams per square meter unless otherwise noted.

EXAMPLE CE2: for the sample referred to as Comparative Example 2 (CE2), solid scattering particles of DPE were used as the second scattering particles, and Ropaque™ TH-1000 HSP (Dow Chemical Co.), i.e., hollow, non-perforated particles were used as the first scattering particles. The coating formulation for the light-scattering layer was as follows:

| Coating Formulation DPE/HSP | |
|---|---|
| Material | Pans |
| Dispersion 1A | 57.0 |
| water | 3.2 |
| binder, 10% solution of polyvinyl alcohol in water | 14.8 |
| Dispersion 2A | 25.0 |

EXAMPLE 2: for the sample referred to as Example 2, solid scattering particles of DPE were again used as the second scattering particles, but the first type of perforated particles (see FIG. 10A) were used as the first scattering particles. The coating formulation for the light-scattering layer was as follows:

| Coating Formulation DPE/Perf. Part. (type 1) | |
|---|---|
| Material | Parts |
| Dispersion 1B | 67.9 |
| water | 2.4 |
| binder, 10% solution of polyvinyl alcohol in water | 11.0 |
| Dispersion 2A | 18.7 |

EXAMPLE 3: for the sample referred to as Example 3, solid scattering particles of DPE were again used as the second scattering particles, but the second type of perforated particles (see FIG. 10B) were used as the first scattering particles. The coating formulation for the light-scattering layer was as follows:

| Coating Formulation DPE/Perf. Part. (type 2) | |
|---|---|
| Material | Parts |
| Dispersion 1C | 67.9 |
| water | 2.4 |
| binder, 10% solution of polyvinyl alcohol in water | 11.0 |
| Dispersion 2A | 18.7 |

EXAMPLE 4: for the sample referred to as Example 4, solid scattering particles of DPE were again used as the second scattering particles, but the third type of perforated particles (see FIG. 10C) were used as the first scattering particles. The coating formulation for the light-scattering layer was as follows:

| Coating Formulation DPE/Perf. Part. (type 3) | |
|---|---|
| Material | Parts |
| Dispersion 1D | 67.9 |
| water | 7.4 |
| binder, 10% solution of polyvinyl alcohol in water | 11.0 |
| Dispersion 2A | 18.7 |

EXAMPLE 5: for the sample referred to as Example 5, solid scattering particles of EGTE were used as the second scattering particles, and the first type of perforated particles (see FIG. 10A) were used as the first scattering particles. The coating formulation for the light-scattering layer was as follows:

| Coating Formulation EGTE/Perf. Part. (type 1) | |
|---|---|
| Material | Parts |
| Dispersion 1D | 67.9 |
| water | 2.4 |
| binder, 10% solution of polyvinyl alcohol in water | 11.0 |
| Dispersion 2A | 18.7 |

EXAMPLE 6: for the sample referred to as Example 6, solid scattering particles of DPS were used as the second scattering particles, and the first type of perforated particles (see FIG. 10A) were used as the first scattering particles. The coating formulation for the light-scattering layer was as follows:

| Coating Fontralation DPS/Perf. Part. (type 1) | |
|---|---|
| Material | Parts |
| Dispersion 1D | 67.9 |
| Water | 2.4 |
| binder, 10% solution of polyvinyl alcohol in water | 11.0 |
| Dispersion 2A | 18.7 |

The first and second scattering particles that were used in the light-scattering layer of these various examples and comparative examples can be summarized as follows:

TABLE 3

| | | 1$^{st}$ particles | | |
|---|---|---|---|---|
| 2$^{nd}$ particles | HSP | Perf. Part. Type 1 | Perf. Part. Type 2 | Perf. Part. Type 3 |
| DPE | CE, CE2 | Ex. 1, Ex. 2 | Ex. 3 | Ex. 4 |
| EGTE | | Ex. 5 | | |
| DPS | | Ex. 6 | | |

Thermal printing was performed on each sample using the Zebra™ thermal printer as described above using the default energy setting of the print head. Brightness of the samples (e.g. of the white or light-colored unprinted background) was measured using the ColorTouch 2 instrument described above. The quality of barcode patterns was evaluated using the TruCheck™ barcode verifier as described above. The results are shown in Table 4:

TABLE 4

| | Bar code quality (ANSI pass/fail) versus print speed | | | Brightness | Optical density |
|---|---|---|---|---|---|
| Example | 6 ips | 8 ips | 10 ips | (UV exc.) | (bkgnd) |
| CE2 | fail | fail | fail | 73.97 | 0.19 |
| 1 | pass | pass | pass | 82.28 | 0.14 |
| 2 | pass | pass | pass | 83.38 | 0.13 |
| 3 | pass | fail | fail | 81.92 | 0.14 |
| 4 | fail | fail | fail | 77.84 | 0.17 |
| 5 | pass | pass | pass | 82.9 | 0.14 |
| 6 | pass | pass | pass | 79.5 | 0.16 |

Heat stability is discussed above as being a desirable quality for certain applications of direct thermal media. The samples for CE2 and Examples 2-6 were therefore tested for heat stability. After a bar code was thermally printed on each sample in the usual fashion, the sample was maintained at constant elevated temperature of 60° C., or 80° C., or 100° C., for 24 hours, then returned to room temperature and the barcode quality (ANSI pass/fail) was re-measured.

In other applications of direct thermal media, itis important for the sample to be able to withstand being in contact with meat wrapping film under a 7 pound weight at 40° C. for 24 hours. The samples for CE2 and Examples 2-6 were therefore subjected to this"plasticizer" test as well. After a bar code was thermally printed on each sample in the usual fashion, the sample was placed in contact with the meat wrapping film under the specified weight for the specified time, and the sample was then removed and the bar code quality was re-measured. The results of this plasticizer test and the heat stability test are shown in Table 5:

TABLE 5

| | Bar code quality (ANSI pass/fail versus elevated heat temperature | | | Plasticizer |
|---|---|---|---|---|
| Example | 60° C. | 80° C. | 100° C. | test at 40° C. |
| CE2 | fail | fail | fail | fail |
| 2 | pass | fail | fail | pass |
| 3 | pass | fail | fail | fail |
| 4 | fail | fail | fail | fail |
| 5 | pass | pass | fail | pass |
| 6 | pass | pass | pass | pass |

Unless otherwise indicated, all numbers expressing quantities, measured properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations.

The use of relational terms such as "top", "bottom", "upper", "lower", "above", "below", and the like to describe various embodiments are merely used for convenience to facilitate the description of some embodiments herein. Notwithstanding the use of such terms, the present disclosure should not be interpreted as being limited to any particular orientation or relative position, but rather should be understood to encompass embodiments having any orientations and relative positions, in addition to those described above.

Various modifications and alterations of this invention will be apparent to those skilled in the art without departing from the spirit and scope of this invention, which is not limited to the illustrative embodiments set forth herein. The reader should assume that features of one disclosed embodiment can also be applied to all other disclosed embodiments unless otherwise indicated. All U.S. patents, patent application publications, and other patent and non-patent documents referred to herein are incorporated by reference, to the extent they do not contradict the foregoing disclosure.

What is claimed is:

1. A recording medium, comprising:
   a substrate;
   a first light-scattering layer carried by the substrate and including first scattering particles having a first melting point; and
   a plurality of second scattering particles proximate the first light-scattering layer, the second scattering particles having a second melting point lower than the first melting point;
   wherein the first light-scattering layer is porous, and the second scattering particles are disposed to, upon melting, fill spaces between the first scattering particles; and
   wherein the first scattering particles comprise perforated particles.

2. The medium of claim 1, further comprising:
   a thermal insulating layer between the first light-scattering layer and the substrate.

3. The medium of claim 1, further comprising:
   a colorant disposed beneath the first light-scattering layer;
   wherein applying sufficient heat at selected print locations to a side of the recording medium on which the first light-scattering layer resides causes the second scattering particles, but not the first scattering particles, to melt at the selected print locations, such that the second scattering particles, upon melting, fill spaces between and within the first scattering particles to render the first light-scattering layer substantially transparent in the selected print locations.

4. The medium of claim 3, wherein the colorant becomes visible at the selected print locations but remains obscured by other portions of the first light-scattering layer.

5. The medium of claim 1, wherein a print quality of the recording medium when used with a thermal printer energy setting of 11.7 mJ/mm$^2$ at a print speed of 6 inches per second (ips) is characterized by an ANSI value of at least 1.5.

6. The medium of claim 1, wherein the first scattering particles have a first average size in a range from 0.5 to 1.5 micrometers, and the second scattering particles have a second average size in a range from 0.2 to 1 micrometer.

7. The medium of claim 1, wherein the second melting point is at least 80° C. or at least 90° C., or in a range from 80 to 150° C., and wherein the first melting point is at least 50° C. greater than the second melting point.

8. The medium of claim 1, wherein the second scattering particles are dispersed throughout the first light-scattering layer.

9. The medium of claim 1, wherein the first light-scattering layer is exposed to air and contains hollow particles from 5% to 20% (total dry solids).

10. The medium of claim 1, wherein the first light-scattering layer contains substantially no hollow particles.

11. The medium of claim 1, wherein the first light-scattering layer is substantially devoid of leuco dyes and acidic developers.

12. The medium of claim 1, wherein the second scattering particles are disposed in a second light-scattering layer adjacent the first light-scattering layer.

13. The medium of claim 1, wherein the second scattering particles comprise a non-polymeric crystalline organic material.

14. The medium of claim 13, wherein the second scattering particles comprise at least one of diphenyl sulfone (DPS), diphenoxyethane (DPE), ethylene glycol m-tolyl ether (EGTE), and β-naphthylbenzylether (BON).

15. The medium of claim 1, wherein the first scattering particles are polymeric or inorganic.

16. The medium of claim 1, wherein the first scattering particles and the second scattering particles are not chemically reactive with each other.

17. The medium of claim 1, wherein neither the first scattering particles nor the second scattering particles contain any chemical functional group.

18. The medium of claim 1, wherein a ratio of the first scattering particles to the second scattering particles, measured in terms of total dry solids, is in a range from 1 to 3.

19. The medium of claim 1, wherein the perforated particles comprise holes with relative sizes of a hole diameter for each hole that is at least 10%, or in a range from 20 to 40%, of a particle diameter of each of the perforated particles.

20. The medium of claim 1, wherein the perforated particles have a hole coverage of at least 40%, or in a range from 40 to 70%, of an outer surface of each of the perforated particles.

21. A recording medium, comprising:
    a substrate; and
    a light-scattering layer carried by the substrate and including first scattering particles, the first scattering particles comprising perforated particles, each such perforated particle having a plurality of openings permitting a smaller object to pass through the perforated particle without contacting any wall of the perforated particle.

22. The medium of claim 21, wherein the first scattering particles are polymeric or inorganic.

23. The medium of claim 21, wherein the first scattering particles do not contain any chemical functional group.

24. A recording medium, comprising:
a substrate; and
a light-scattering layer carried by the substrate and including first scattering particles, the first scattering particles having a caged morphology including a plurality of openings permitting a smaller object to pass into and/or through the first scattering particles.

25. The medium of claim 24, wherein the first scattering particles comprise holes with relative sizes of a hole diameter of the holes that is in a range from 20 to 40% of a particle diameter of each of the perforated particles.

26. The medium of claim 24, wherein the first scattering particles have a hole coverage in a range from 40 to 70% of an outer surface of each of the perforated particles.

* * * * *